(12) United States Patent
Farley et al.

(10) Patent No.: US 7,390,253 B2
(45) Date of Patent: Jun. 24, 2008

(54) FLOW DISTRIBUTOR APPARATUS FOR CONTROLLING SPREAD WIDTH OF A STRAW SPREADER

(75) Inventors: Herbert M. Farley, Elizabethtown, PA (US); Nathan E. Isaac, Leola, PA (US); Andrew V. Lauwers, Stevens, PA (US); Jason M. Benes, Mount Joy, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/804,913

(22) Filed: May 21, 2007

(65) Prior Publication Data

US 2007/0275775 A1    Nov. 29, 2007

Related U.S. Application Data

(60) Provisional application No. 60/808,369, filed on May 25, 2006.

(51) Int. Cl.
*A01F 12/30* (2006.01)
(52) U.S. Cl. ........................... 460/111; 239/673
(58) Field of Classification Search .............. 239/650, 239/673, 667, 668, 661; 460/111, 112, 113, 460/901, 119; 56/503
See application file for complete search history.

(56) References Cited

U.S. PATENT DOCUMENTS

| | | | |
|---|---|---|---|
| 1,233,749 A | 7/1917 | Bruner | |
| 2,538,886 A | 1/1951 | Skibbe et al. | 275/8 |
| 3,232,627 A | 2/1966 | Larson | 275/15 |
| 3,539,113 A * | 11/1970 | Tyler | 239/673 |
| 4,917,652 A | 4/1990 | Glaubitz et al. | 460/111 |
| 5,797,793 A * | 8/1998 | Matousek et al. | 460/111 |
| 5,890,353 A | 4/1999 | Brown | 56/60 |
| 6,251,009 B1 | 6/2001 | Grywacheski et al. | 460/112 |
| 6,406,368 B1 | 6/2002 | Cruson et al. | 460/111 |
| 6,572,035 B1 * | 6/2003 | Pfeiffer | 239/650 |

(Continued)

FOREIGN PATENT DOCUMENTS

DE            3331169            3/1985

(Continued)

*Primary Examiner*—Árpád Fábián-Kovács
(74) *Attorney, Agent, or Firm*—Michael G. Harms; John William Stader; Patrick M. Sheldrake

(57) ABSTRACT

A flow distributor apparatus for a vertical spreader operable for discharging a flow of straw or other crop residue in a sideward direction over a field, the flow distributor apparatus including a flow guide element, an adjusting mechanism, and a coupling connector connecting the flow guide element to the adjusting mechanism for controllable repositioning of the flow guide element relative to the spreader paddles. The flow guide element is disposed generally adjacent to the back plate of the spreader and intermediate the spreader paddles with an apex portion, laterally extending arm portions, and longitudinally extending crop residue flow surfaces, at least portions of which crop residue flow surfaces extend beneath the spreader paddles. The adjusting mechanism is operable to effect at least either vertical, horizontal, or rotational movement of the flow guide element relative to the spreader paddles to adjustably vary the clearances between the outer swept diameters of the spreader paddles and the crop residue flow surfaces to control the sidewardly outwardly discharge of crop residue from the spreader.

29 Claims, 22 Drawing Sheets

U.S. PATENT DOCUMENTS

| | | | |
|---|---|---|---|
| 6,598,812 B1 | 7/2003 | Matousek et al. | 239/682 |
| 6,602,131 B2 * | 8/2003 | Wolters | 460/111 |
| 6,893,340 B1 * | 5/2005 | Schmidt et al. | 460/111 |
| 6,908,379 B2 | 6/2005 | Gryspeerdt et al. | 460/111 |
| 7,074,126 B2 | 7/2006 | Weichholdt et al. | 460/112 |
| 7,223,168 B2 * | 5/2007 | Anderson et al. | 460/111 |
| 2002/0072400 A1 | 6/2002 | Foth | 460/112 |
| 2003/0003974 A1 | 1/2003 | Niermann et al. | 460/111 |
| 2003/0017861 A1 | 1/2003 | Niermann et al. | 460/112 |
| 2003/0109293 A1 * | 6/2003 | Wolters | 460/111 |
| 2005/0059445 A1 * | 3/2005 | Niermann et al. | 460/112 |
| 2005/0124399 A1 | 6/2005 | Holmen | 460/111 |
| 2006/0183519 A1 | 8/2006 | Benes | 460/111 |
| 2007/0026912 A1 * | 2/2007 | Anderson et al. | 460/112 |

FOREIGN PATENT DOCUMENTS

| | | |
|---|---|---|
| DE | 3820681 | 12/1989 |
| EP | 0084872 | 8/1983 |
| EP | 0104622 | 4/1984 |
| EP | 0404141 | 12/1990 |
| EP | 0551949 | 7/1993 |
| FR | 2708214 | 2/1995 |

* cited by examiner

FLOW DISTRIBUTOR APPARATUS FOR CONTROLLING SPREAD WIDTH OF A STRAW SPREADER

This application claims the benefit of U.S. Provisional Application No. 60/808,369, filed May 25, 2006.

TECHNICAL FIELD

This invention relates generally to an agricultural combine and a flow distributor apparatus therefore which is operable for controlling the spread width discharge of a flow of straw or other crop residue in a sideward direction for deposit on and over a field, and the method of use thereof, and, more particularly, to an adjustably positionable flow guide element for a vertical spreader, which flow guide element is located generally intermediately adjacent to counter-rotating spreader paddles of the vertical spreader to receive and direct the flow of crop residue therefrom and is adjustably repositionable relative to the spreader paddles to controllably adjust the flow of crop residue to effect a desired pattern of crop residue flow therefrom, for instance, so as to better and more evenly distribute the flow side to side over a swath of an agricultural field from which the crop was harvested.

BACKGROUND ART

Historically, combines have typically included or had associated therewith a crop residue spreader for disposing onto the field from which the crop was harvested the straw and other residue separated from the harvested crop. In addition, some combines have employed a chaff spreader for spreading chaff residue separated from the grain by the cleaning apparatus or system onto the crop field. With earlier spreaders, however, in many instances, uneven distribution of the crop residue occurred, with a greater or heavier concentration often being distributed nearer the center of the swath and a lesser or lighter concentration being distributed father sidewardly. Such uneven distribution resulted in various problems such as, but not limited to, subsequent difficulty in passing fall tillage tools through residue clumps or thick areas, uneven insulation of the field, resulting in uneven field warming and thawing and subsequent uneven crop emergence during the following planting season, and other problems resulting from increased rodent and insect habitat.

Consequently, it was recognized that it would be desirable to be able to spread the straw, chaff, and other residue as evenly as possible over the entire width or swath of that section of the field over which the combine has just passed and from which crops had been harvested. It was also recognized that, in some instances, in order to compensate for crop type, varying moisture and weather conditions, such as wind and the like, and also combine header width, it would be further desirable to have an ability to adjust the crop residue spread.

Efforts to address such concerns and desires have been ongoing, and various crop residue spreaders have been developed which can propel residue a distance equal to about one half the width of a typical combine header, rather than simply dropping or distributing the crop residue behind the spreader. However, such spreaders have continued to suffer from various shortcomings. Many of such spreaders have exhibited a tendency to provide uneven crop residue distribution or coverage in the side to side direction over the swath, especially on uneven and varying terrain and in varying wind conditions. For example, with reference to a vertical spreader, that is, a spreader utilizing one or more rotary impellers or other elements rotatable about a generally horizontal axis, or an axis oriented or tilted at a small acute angle to horizontal, and configured for directing a flow or flows of crop residue sidewardly, the resultant distribution has often tended to be uneven in the sideward direction, for instance, typically thicker in one region or along one side of the swath, and thinner or less uniform in another region or along the other side of the swath, sometimes due, in part, to varying geographical and environmental conditions.

Thus, what has been sought is a crop residue flow distributor for a vertical crop residue spreader, having a capability to adjustably distribute or guide portions of a discharged flow of crop residue for achieving a desired pattern of the distributed residue across the entire width or swath of the harvest cut, under varying geographical and environmental conditions, which can effect more even distribution side to side over a region of an agricultural field from which the crop was harvested, to thereby achieve the advantages, and avoid the shortcomings and problems, of the prior art devices, discussed hereinabove.

One recent development in such regard has been an adjustable crop residue flow distributor apparatus for a vertical crop residue spreader of an agricultural combine, as disclosed and discussed in co-pending U.S. patent application Ser. No. 11/194,844, which residue flow distributor includes fore and aft adjustment capabilities and a flow guide element, positioned generally adjacent to spreader paddles, that includes movably adjustable arm elements, the positions of which arm elements can be altered to adjust the flow of crop residue.

Efforts to develop other improved constructions that will overcome the various problems discussed hereinabove have continued, and it has now been found that reliable results can also be achieved by employing a residue flow distributor apparatus, as described hereinafter, that does not need to have or rely upon fore and aft adjustments of the flow distributor or movably adjustable arm elements, and the complexities associated therewith, yet which can deliver improved side to side distribution of the crop residue.

SUMMARY OF THE INVENTION

There is thus disclosed herein a flow distributor apparatus for an agricultural combine which is operable for discharging a flow of straw or other crop residue in a sideward direction for deposit on and over a field, and, more particularly, a flow distributor apparatus that includes a flow guide or distributor element that is adjustably repositionable adjacent to counter-rotating spreader paddles to receive and direct the flow of crop residue therefrom. The flow distributor apparatus includes an adjusting mechanism which is operable to adjustably reposition the flow guide element relative to the spreader paddles to controllably adjust the clearance between the outer swept diameter of the spreader paddles and the crop residue flow surfaces of the flow guide element. Such changes in clearance alter and redirect the flow of crop residue so as to effect a desired pattern of crop residue flow from the spreader, such as to compensate for changing geographical and environmental conditions, in order that, under such conditions, a better and more even distribution of the crop residue may be realized over the entire width of the cut.

According to a preferred aspect of the invention, the flow distributor apparatus includes a distributor or flow guide element portion, hereinafter sometimes referred to as the flow guide or the flow guide element, that has an apex portion with opposed laterally extending wing or arm portions depending therefrom to free end portions and side surfaces extending generally longitudinally between fore and aft ends of the flow guide element portion, with the longitudinally extending side surfaces defining crop residue flow surfaces. The flow guide element portion is supported on a combine, such as at the back sheet or back plate of the spreader, beneath a generally downwardly facing inlet or entry opening at which the crop residue is introduced into the flow residue distribution system and generally intermediate to the spreader paddles, with at least the free end portions disposed such that the crop residue flow surfaces are located generally extending beneath portions of the spreader paddles and sidewardly outwardly relative thereto to the free end portions of the flow guide, for carrying and guiding a flow of crop residue from the entry opening and the spreader paddles so that such residue will flow sidewardly and outwardly from the spreader for distribution over a field.

The flow distributor apparatus also includes an adjusting mechanism operable to effect movement of the flow guide element at least either vertically or horizontally or rotationally relative to the spreader paddles, such that the clearance between the outer swept diameter of the spreader paddles and the flow surfaces of the flow guide element can be adjustably varied, including optionally as desired or required, to control the side to side residue spread.

A coupling connector, which may take the form of a protrusion at the aft end of the flow guide element, such as a tab projection or an extending stud or shaft, and which passes through an opening in the back sheet or back plate of the spreader, couples the flow guide element to the adjusting mechanism such that operation of the adjusting mechanism will effect a repositioning of the coupling connector and of the flow guide element coupled thereto. Such repositioning may result in a vertical movement of the flow guide element, a horizontal movement of the flow guide element, or a rotation of the flow guide element, or a combination of such movements, relative to the spreader paddles.

In accordance with one preferred embodiment of the invention, which is designed to address vertical movement of the flow guide element relative to the spreader paddles, the adjusting mechanism includes a cart or carriage assembly coupled to the flow guide element through the coupling connector for maintaining the flow guide element generally adjacent to the frontside of the back sheet or back plate of the spreader and for effecting generally vertical movement of the flow guide element relative to the spreader paddles. The cart or carriage assembly is generally vertically movable along the backside of the back plate of the spreader, such as under control of an electrically operable screw drive or linear actuator, and is preferably mounted at or beyond the back plate of the spreader. The coupling connector extends through an opening in the back plate of the spreader, which opening, for such embodiment, may be an elongated, generally vertical slot though which the coupling connector can extend and along which the coupling connector can be moved. Biasing elements, such as springs, may preferably be associated with the cart and utilized to provide a tension, applied through the coupling connector, to maintain the flow guide element in close association with or close proximity to the frontside of the back plate of the spreader, and an insert having a low coefficient of friction may be employed to minimize the effect of frictional forces between the aft end of the flow guide element and the back sheet or back plate of the spreader as the flow guide element is being repositioned or adjusted.

Although, for such preferred embodiment, the opening in the back plate of the spreader is noted as being a vertical slot, the opening may, for other embodiments, be sized and configured to permit the type of and maximum repositioning to be allowed for a flow guide element and, consequently, such opening could be a horizontal slot, a box, circle, or ellipse, or other configuration suitable for the particular embodiment utilized and the effects desired.

In certain preferred forms of the flow guide element portion, the wing or arm portions thereof are essentially mirror images of one another, with the crop residue flow surfaces including concavely curved surface segments for receiving the flow being directed thereto by respective spreader paddles and for directing the flow of residue along such surfaces for generally sidewardly discharge therefrom. To assist in sidewardly distribution, finger projections may be mated to the flow guide element along the free end portions thereof to extend further sidewardly generally below the spreader paddles. When the flow guide element is positioned generally centrally intermediate the spreader paddles, it can be vertically moved relative to the spreader paddles such that, in at least one positioning, the concavely curved surface segments of the wing or arm portions of the flow guide element are generally concentric with the sweep diameters of the respective spreader paddles.

Other and additional embodiments of the invention and forms of components thereof, including various forms of the flow guide element portion, the coupling connector, and the adjusting mechanism, including adjusting mechanism features such as trolley carts and tripod carriers, as well as a further and more complete understanding of the invention, may be derived and will become apparent from a consideration of the following detailed specification in conjunction with the accompanying drawings, wherein:

DETAILED DESCRIPTION OF THE INVENTION

Figure 1:
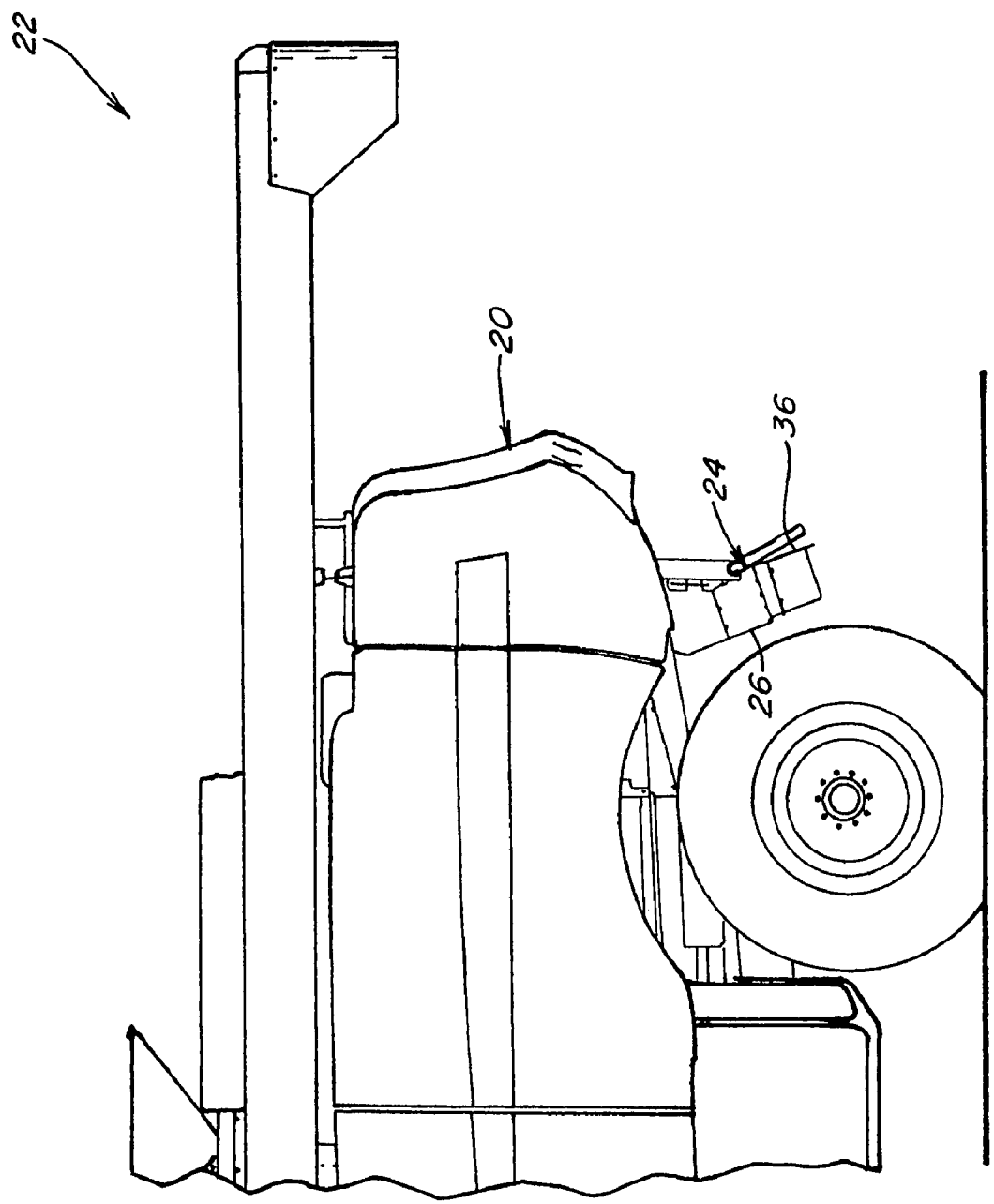
FIG. 1 is a simplified, fragmentary side view of the rear end of a representative agricultural combine that has associated therewith a crop residue distribution system, including a spreader that includes a pair of spreader paddles for spreading crop residue.

Referring now to the drawings, wherein preferred embodiments of the present invention are shown, wherein like numerals refer to like items, and wherein prime designators in conjunction with a numeral, e.g., 42' and 42", identify variations of the element designated by that numeral, FIG. 1 depicts a rear end 20 of a self-propelled agricultural combine 22, including a vertical crop residue spreader 24 operable for spreading straw, stalks, or other crop residue and trash that has been separated from the grain of the crops by a threshing mechanism (not shown) of combine 22 located forwardly of rear end 20. The straw, stalks and the like are propelled rearwardly by rotating beaters or the like (also not shown) from the threshing mechanism and downwardly through a rear cavity of combine 22 to vertical spreader 24, which includes within a housing 26 of sheet metal or other construction, components for effecting the spread and optional chopping of crop residue thereby, all in the well known manner.

Figure 2:
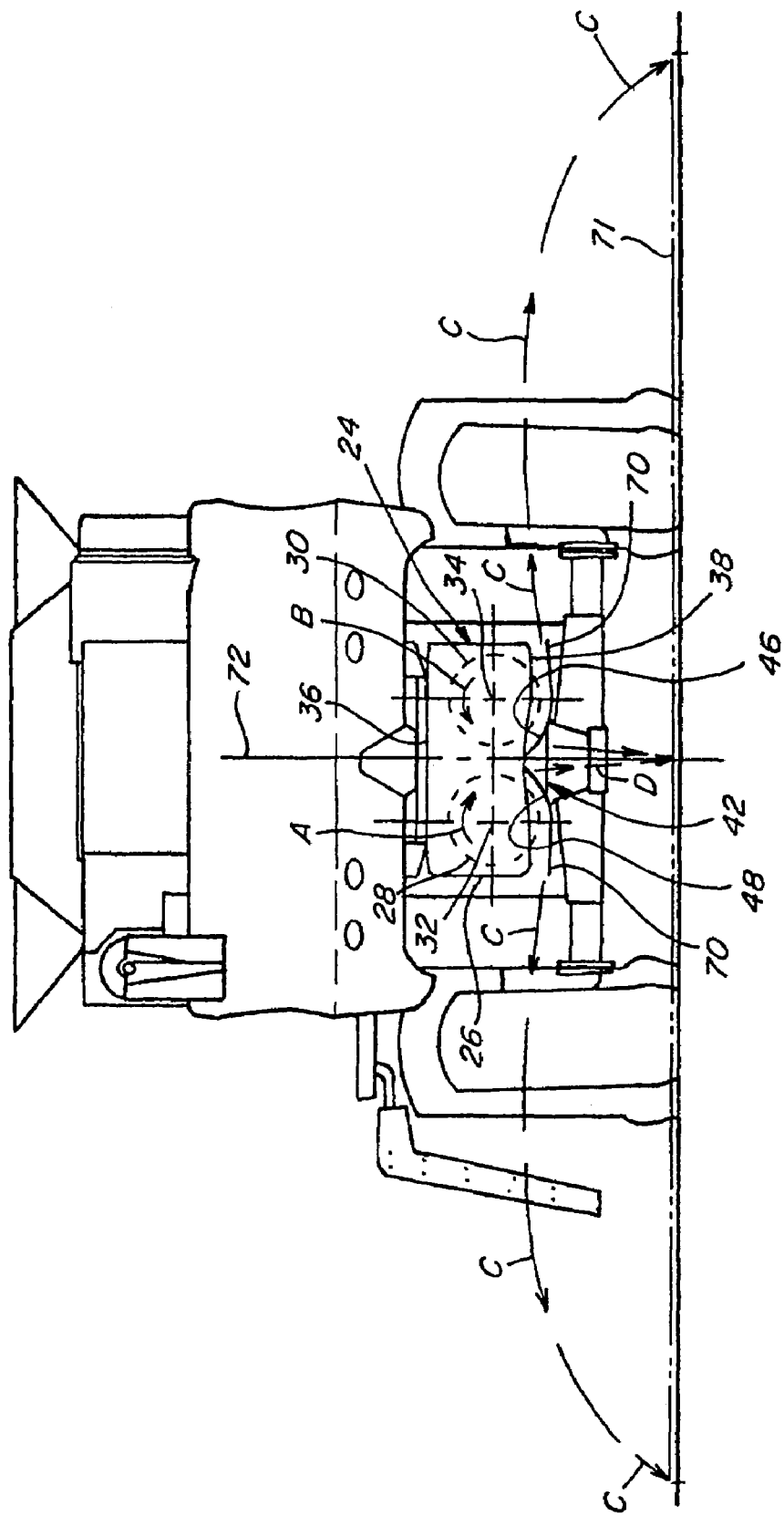
FIG. 2 is a rear view of such combine, generally depicting the location of the crop residue distribution system and certain components thereof.

With further reference to FIG. 2, where, for purposes of clarity, certain elements or components associated with the rear or aft portion of the back sheet or back plate of the spreader 24 are not necessarily shown, spreader 24 is depicted including a pair of side by side rotary impellers 28 and 30 rotatable in opposite predetermined rotational directions, denoted by arrows A and B, about respective rotational axes 32 and 34. Here, it should be understood that impellers 28 and 30 are representative of a variety of rotary devices that can be utilized in a spreader of this type, such as a rotor having fixed blades, or carrying a plurality of knives, such as flail knives, for propelling the crop residue outwardly from the housing. For ease of reference and description hereinafter, the term "spreader paddles" should therefore be understood to include not only the paddle-type blades depicted in the drawings herein, but also the entire variety of rotary devices that may be utilized in or with a spreader of this type. The spreader can additionally optionally include a rank of fixed knives through which the rotating knives pass for chopping crop residue.

Impellers 28 and 30, which may form or include paddles of appropriate sizes and configurations for the uses intended, are rotated by suitable driving elements, such as by conventionally constructed and operable hydraulic motors powered by pressurized hydraulic fluid received from a pump (not shown) of combine 22, an electric motor, belt, or the like, again in the well known manner. Rotational axes 32 and 34 extend at least generally in the fore and aft directions, that is, generally forwardly and rearwardly with respect to combine 22, and are generally horizontal or oriented at a small acute angle to horizontal, depending on an orientation or tilt of spreader 24 on combine 22, which can be optionally variable and adjustable in the well known manner.

Housing 26 of spreader 24 includes spaced, opposed radial side walls, and a rear wall 36, sometimes referred to as the back sheet or back plate of the spreader, extending therebetween across the width of spreader 24, defining an internal cavity containing impellers 28 and 30. Housing 26 defines a forwardly and upwardly facing inlet opening for receiving the residue flow from the threshing system, and a downwardly facing discharge opening 38, through which the residue is propelled downwardly and in opposite sideward directions by impellers 28 and 30, respectively.

Figure 5:
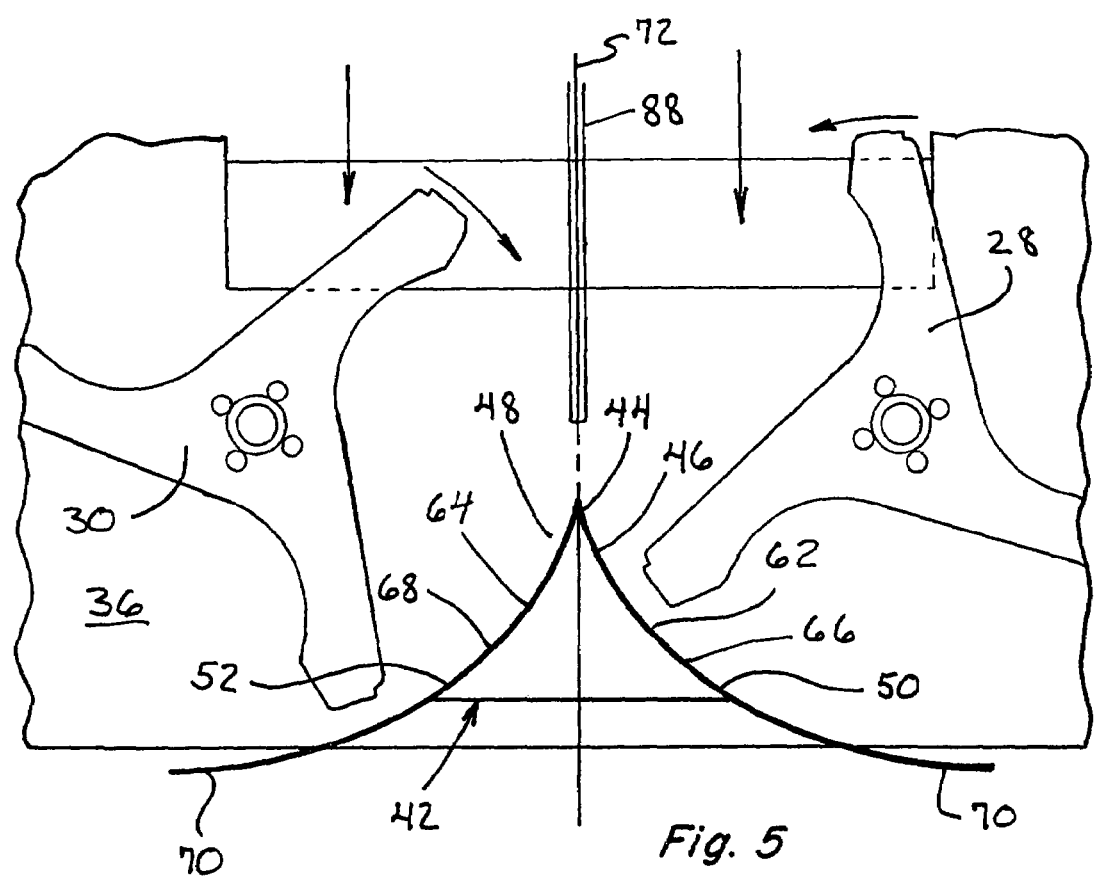
FIG. 5 is a representation of a flow guide element such as it might appear relative to the spreader paddles in a given position.
Figure 6:
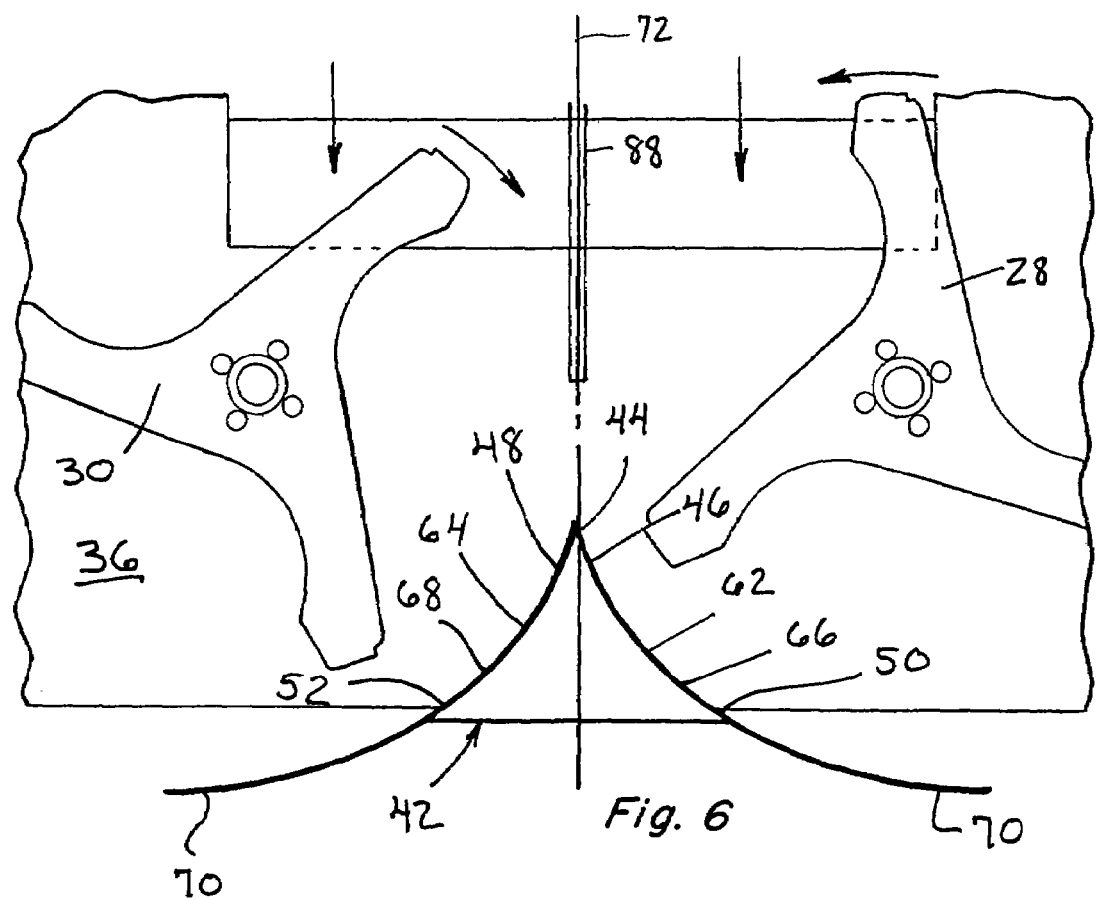
FIG. 6 is a representation of the flow guide of FIG. 5 as it might appear when moved vertically downward relative to the spreader paddles.
Figure 7:
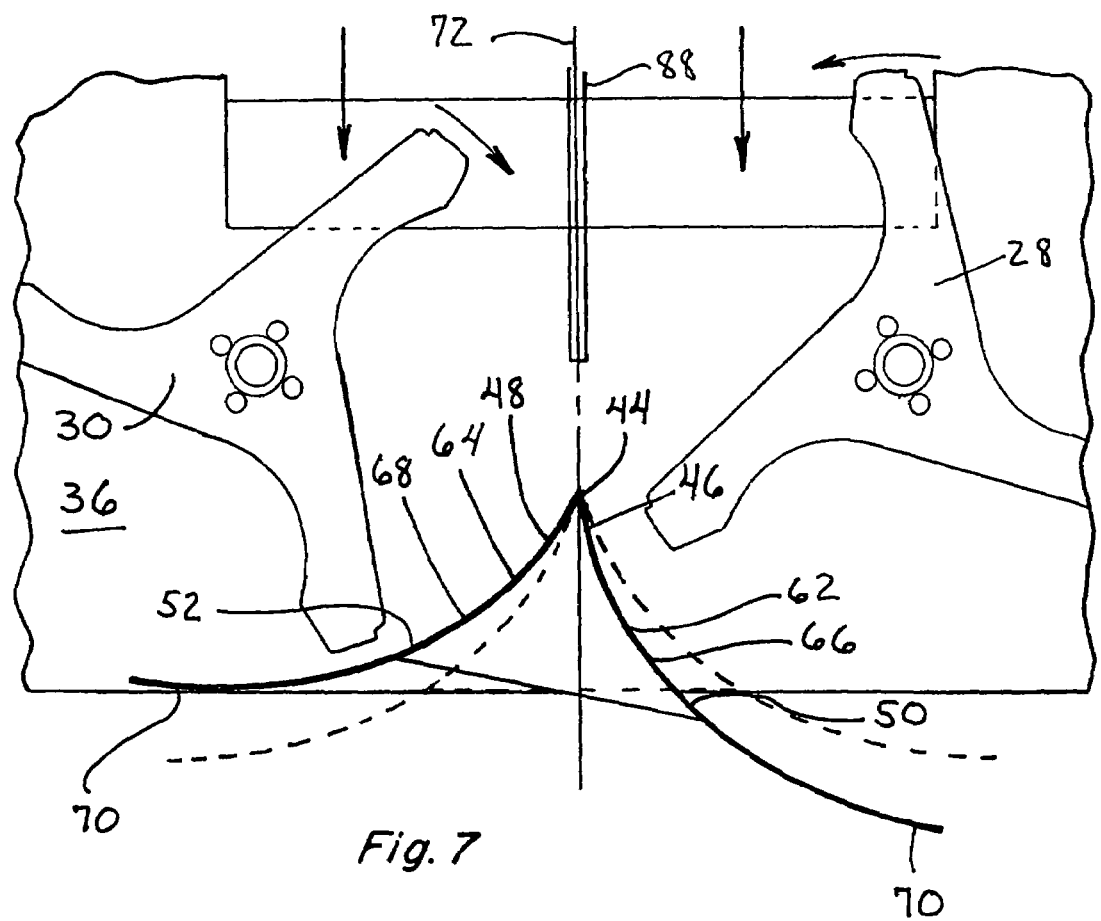
FIG. 7 is a representation of the flow guide of FIG. 5 as it might appear when rotated relative to the spreader paddles.
Figure 8:
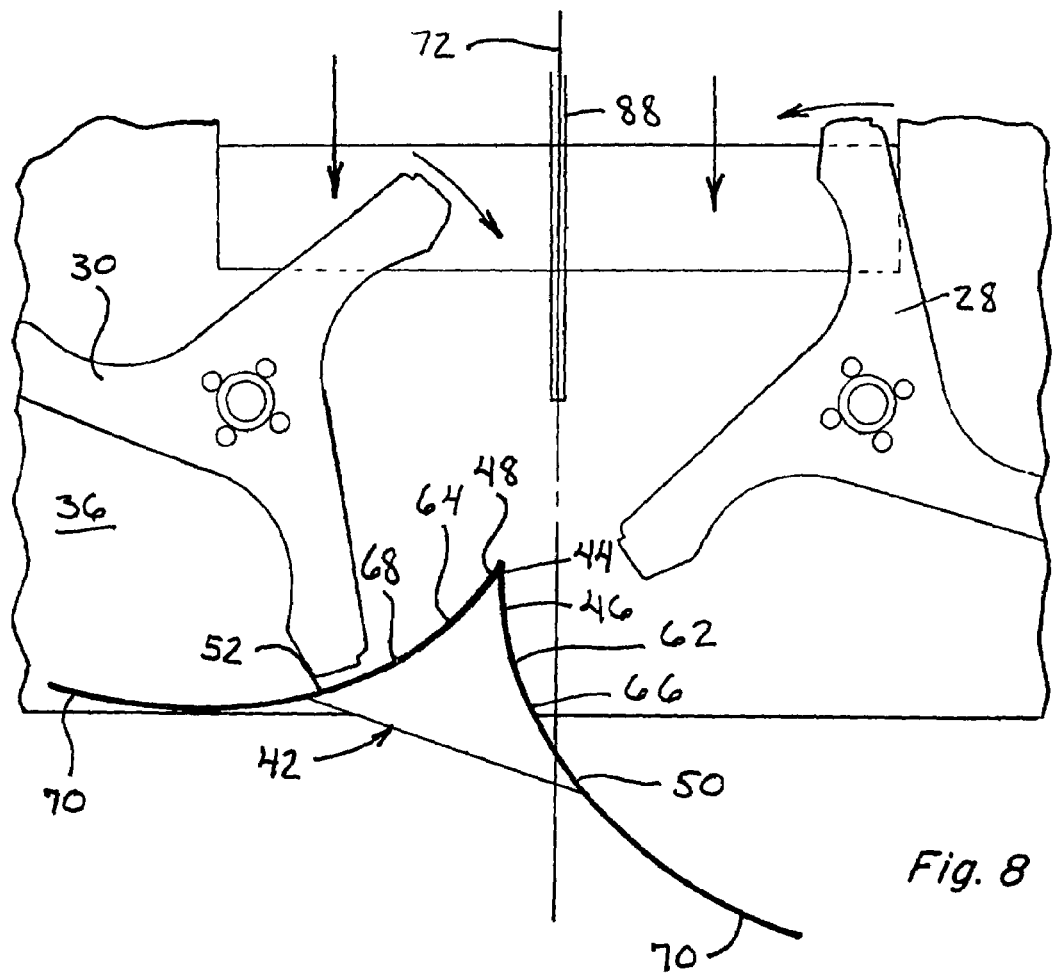
FIG. 8 is a representation of the flow guide of FIG. 5 as it might appear when moved vertically downward relative to the spreader paddles, horizontally towards the spreader paddle on the left in such representation, and rotated relative to the spreader paddles.

Residue flow within housing 26 is propelled by the rotating impellers 28 and 30 in the predetermined rotational directions A and B along circumferential flow paths, at speeds equal to or increased relative to the inlet speed of the residue flow such that the residue does not build up at the inlet and is expelled from housing 26 through discharge opening 38 at a corresponding speed. In the instance wherein spreader 24 is solely used for spreading, the speed imparted to the residue by impellers 28 and 30 will be sufficient to effect airborne travel of the residue a substantial sideward distance from combine 22 for deposit on regions of the agricultural field over which combine 22 has just traveled and from which the crops have been harvested.

As noted hereinabove, it is desired in many instances to distribute the crop residue discharged by impellers 28 and 30 substantially evenly over the width of a swath of the field from which the crop has just been harvested by combine 22, which width is typically defined by the overall width of a harvesting head of combine 22, which width can be as much as 30 to 40 feet in the instance of some heads currently in use. Thus, it is desirable that rotary impellers 28 and 30 have the capability to expel or propel crop residue a distance of up to about 20 feet or so therefrom, corresponding to one-half the width of the header used on combine 22, and possibly farther as combine headers of greater width are introduced. Impellers 28 and 30 can be suitably configured and rotated at a sufficient velocity for propelling crop residue such as, but not limited to, chopped straw, stems and branches, cobs and the like, the required distance of up to one-half the width of a header currently being used, by a conventional hydraulic motor or any other suitable driver as mentioned above. The problem to be currently overcome, however, is distributing the crop residue substantially evenly over this distance of up to about 20 feet or so, including in the region of a swath directly beneath spreader 24, and under varying geographical and environmental conditions.

The flow distributor apparatus of the present invention is primarily associated with spreader 24, and especially with back sheet or back plate 36 thereof. As depicted in FIGS. 3-8, one possible embodiment 40 (FIG. 4) of the flow distributor apparatus according to the present invention may include a flow guide element portion 42 disposed within housing 26 of spreader 24 abutting back sheet 36. Flow guide element portion 42, which is preferably of suitable, rigid construction, such as of sheet metal, or plastics, is depicted having an apex portion 44 with opposed laterally extending wing or arm portions 46 and 48 depending therefrom to respective free end portions 50 and 52 and extending longitudinally between fore and aft ends 54 and 56 thereof, including along angled edges 58 (FIG. 10) and 60, with the longitudinal surfaces 62 and 64 defining crop residue flow surfaces. In the particular embodiment depicted, the wing or arm portions 46 and 48 are essentially, but need not be, mirror images of one another, with the crop residue flow surfaces including curved surface segments 66 and 68, and having finger projections 70 mated with the flow guide element 42 near the free end portions 50 and 52 thereof. Flow guide element portion 42 serves to guide and carry the received crop residue flow sidewardly outwardly away from spreader 24 and to distribute the crop residue, illustrated by strings of oppositely directed arrows C and downwardly directed arrows D in FIG. 2, for distribution in a pattern on a field, represented by dotted line 71 in FIG. 2.

For purposes of clarity in the further discussion of the present invention, it should be understood that, within the context of these discussions, the term "sideward" is meant to refer to or identify a direction generally transverse to the fore and aft directions, the term "sidewardly outwardly" is meant to refer to a sideward direction away from a center line 72 (FIG. 2) of spreader 24, and the term "sidewardly inwardly" is meant to refer to a sideward direction towards or closer to center line 72.

As may be better observed with reference to FIG. 4, the flow guide element 42 is typically positioned with its aft end 56 in close proximity to, or abutment with, the frontside of back sheet or back plate 36 and connected through a coupling connector 74 extending through an opening 76 in back plate 36 to an adjusting mechanism, depicted generically as block element 78. Such coupling connector 74 may take various forms, including, but not limited to, a projecting tab or projecting threaded stud at the aft end 58 of flow guide element 42 that extends through opening 76. Typically, the adjusting mechanism may include a framework or carrier assemblages having controllably operable elements to effect the repositioning of the coupling connector 74 within the opening 76 in the back plate 36, thereby effecting repositioning of the coupled flow guide element 42 relative to the spreader paddles, and biasing means, such as springs, to bias the adjusting mechanism 78 away from the backside of the back plate 36 and to thus maintain the aft end 56 of flow guide element 42, through coupling connector 74, in close proximity to the frontside of back plate 36, all of which may be of conventional construction and well known operation.

In such regard, the particular configuration of adjusting mechanism 78 is not considered critical to the subject invention, and adjusting mechanism 78 can thus take or include many known forms, including, by way of example and not of limitation, carriage or frame mounted x-y worm drive constructions, rack and pinion arrangements, geared assemblages, including ring gear constructions, and linear actuator controlled cart assemblies, to effect the particular flow guide movements desired for the combine and spreader, which movements may be any or all of vertical, horizontal, or rotational movement. The adjustment may be effected by any appropriate means, including, but not limited to, mechanical, hydraulic, and electric means, including through the use of hydraulic cylinders and linear actuators, and in any manner appropriate for the combine and spreader in use. One or more adjustment actuator components for effecting movement of the coupling connector 74 and coupled flow guide element 42 may be provided, depending upon the movement positioning desired, which actuator components may be directly or remotely actuatable for effecting vertical, horizontal, or rotational movement of the flow guide element, either independently or in combination. Such actuator components can be any suitable commercially available devices, such as, but not limited to, electric or other motors, cylinders, solenoids, or the like, and can be controlled from a suitable location, such as an operator cab of the combine. With particular reference to FIG. 4, lead lines 80, 82, and 84 are illustrative of command lines for delivery of horizontal (X) adjustment, vertical (Y) adjustment, and rotational (R) adjustment commands to actuators of adjusting mechanism 78.

As may also be observed from FIGS. 3-8, for the particular form of flow guide element disclosed therein, a center flow divider 88, which is depicted as being of a projecting generally triangular shape, is preferably positioned generally above flow guide element portion 42, and extending forwardly from back plate 36 so as to be disposed between impellers 28 and 30, approximately at center line 72, for dividing crop residue flow therebetween and for directing the bulk of residue flow from impeller 28 and its spreader paddles towards wing portion 46 of flow guide element portion 42 and from impeller 30 and its spreader paddles towards wing portion 48 of flow guide element portion 42.

FIGS. 5-8 show the position of the flow guide element 42 in several different positionings relative to the spreader paddles. FIG. 5 depicts the flow guide element generally centered both horizontally and rotationally along center line 72, at one vertical position. FIG. 6 depicts the flow guide element as it might appear when moved vertically lower, but maintaining the general horizontal and rotational centering about center line 72. FIG. 7 depicts the flow guide element 42 at approximately the same vertical elevation as in FIG. 5, but rotated towards impeller 30 and its spreader paddles, with the dotted outline illustrating what the positioning would be if flow guide element were counter-rotated a like amount towards impeller 28 and its spreader paddles. FIG. 8 depicts the flow guide element at approximately the same vertical elevation as in FIG. 6, but horizontally displaced from center line 72 towards impeller 30 and its spreader paddles, and also rotated towards impeller 30 and its spreader paddles. As is clearly illustrated in FIGS. 5-8, the clearance between the tips of the spreader paddles as the paddles rotate past the flow guide element 42 is dependent upon the vertical, horizontal, and rotational position of flow guide element 42 relative to the spreader paddles of impellers 28 and 30.

As the crop residue enters the top of the spreader 24, the counter-rotating impellers 28 and 30 direct a significant portion of the residue flow towards center divider 88 and downwardly therealong towards flow guide element 42. The distance that spreader 24 can discharge crop residue is related to the clearance between the tips of the spreader paddles as the paddles rotate past the flow guide element 42. If flow guide element 42 remains fixed in a given position, the clearance will also remain fixed, and the spread width will therefore also remain fixed for the then-current conditions in which the combine 22 and spreader 24 are operating. However, by repositioning the flow guide element 42 to change the clearance between the tip of the spreader paddles as the paddles rotate past the flow guide element 42, the spread width can be altered. Depending upon the positioning of flow guide element 42, flow of the crop residue for discharge from the spreader 24 can be altered to some extent to result in a greater or lesser sidewardly outwardly throw of the residue, and the positioning of the flow guide element can be selected based upon factors such as terrain, crop, and wind conditions to result in a desired crop residue distribution.

As discussed hereinabove, the flow distributor apparatus may be configured such that the flow guide element 42 can be repositioned in any or all of vertical, horizontal, or rotational directions. In some circumstances and with some equipment, adequate results may be realized by use of a flow distributor apparatus that is repositionable in only one of such directions, such as in the vertical direction. In such regard, FIGS. 9-15 depict a particular preferred flow distributor apparatus that employs vertical repositioning of a flow guide element portion 42', which is similar in many respects to flow guide element 42 of FIGS. 3-8 but which includes an attached divider plate 88' at the apex portion 44' of flow guide element portion 42', to achieve desired distribution results and includes no provision for effecting horizontal or rotational repositioning of the flow guide element 42'.

The illustrated attachment of the divider plate 88' to the apex portion 44' of flow guide element portion 42' obviates various difficulties that might otherwise arise from use of the split form of the divider plate 88 and flow guide element portion 42 of FIGS. 3-8 due to a tendency of the crop residue to lodge in the gap between the top or apex portion 44 of the flow guide element 42 and the divider plate 88. The alternate flow guide element 42', with attached divider plate 88', can be readily and advantageously employed, especially in constructions wherein horizontal and/or rotational repositioning is not required. Preferably, for enhanced performance, in situations and settings where the use of an attached divider plate may not be desirable or possible, the gap between an unattached divider plate and the flow guide element will be kept to a minimum, so far as is possible, and the divider plate may be designed and constructed to move with or in correspondence to the flow guide element, and preferably parallel to the machine center plane, so as to generally divide the crop residue.

Figure 3:
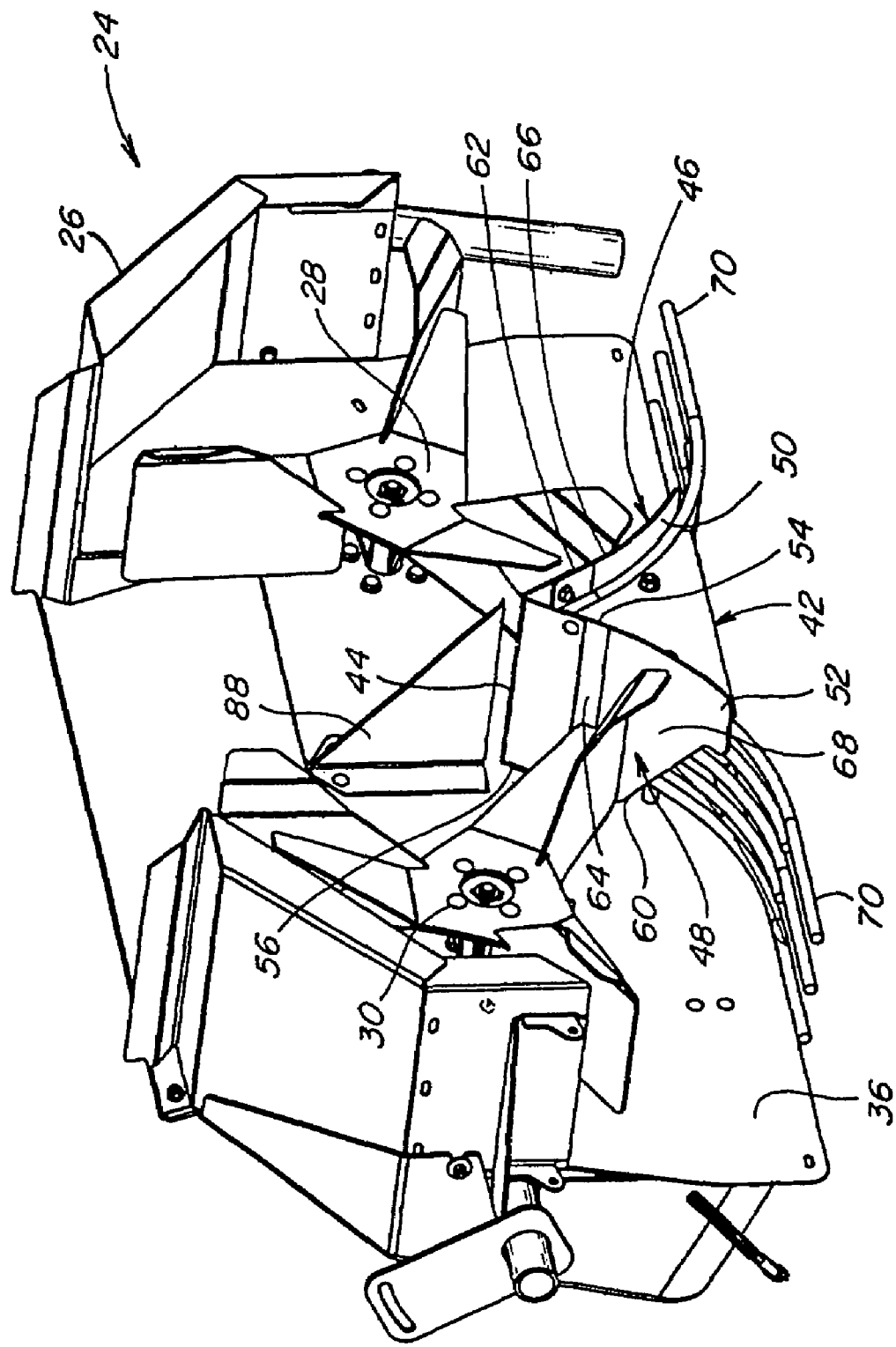
FIG. 3 is a perspective view of a portion of the spreader showing the positioning of the spreader paddles relative to a flow guide element of the present invention.
Figure 4:
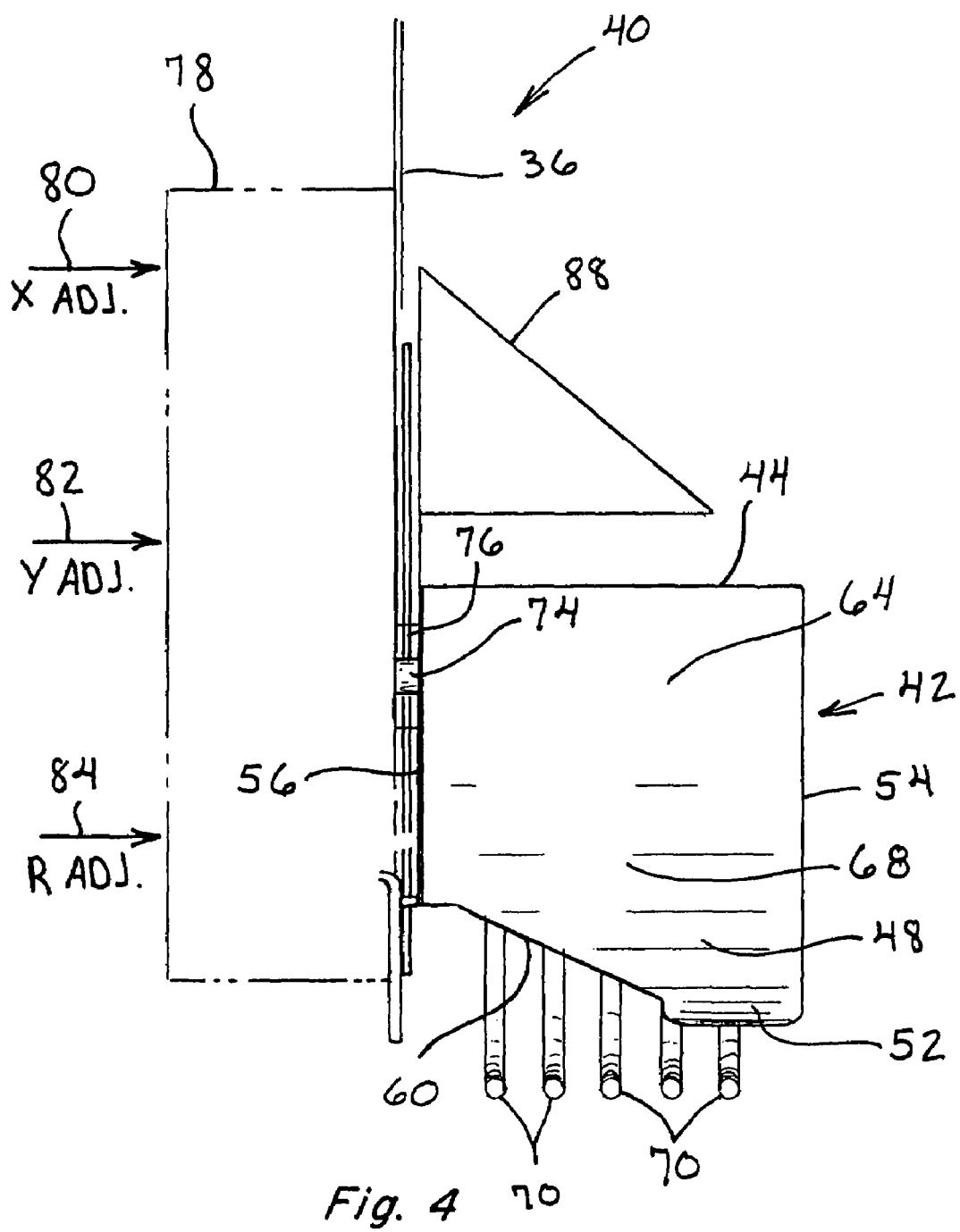
FIG. 4 is simplified right-side view of the flow guide element of FIG. 3 relative to the back sheet or back plate of the spreader and including a generic representation of a coupled adjustment mechanism.
Figure 10:
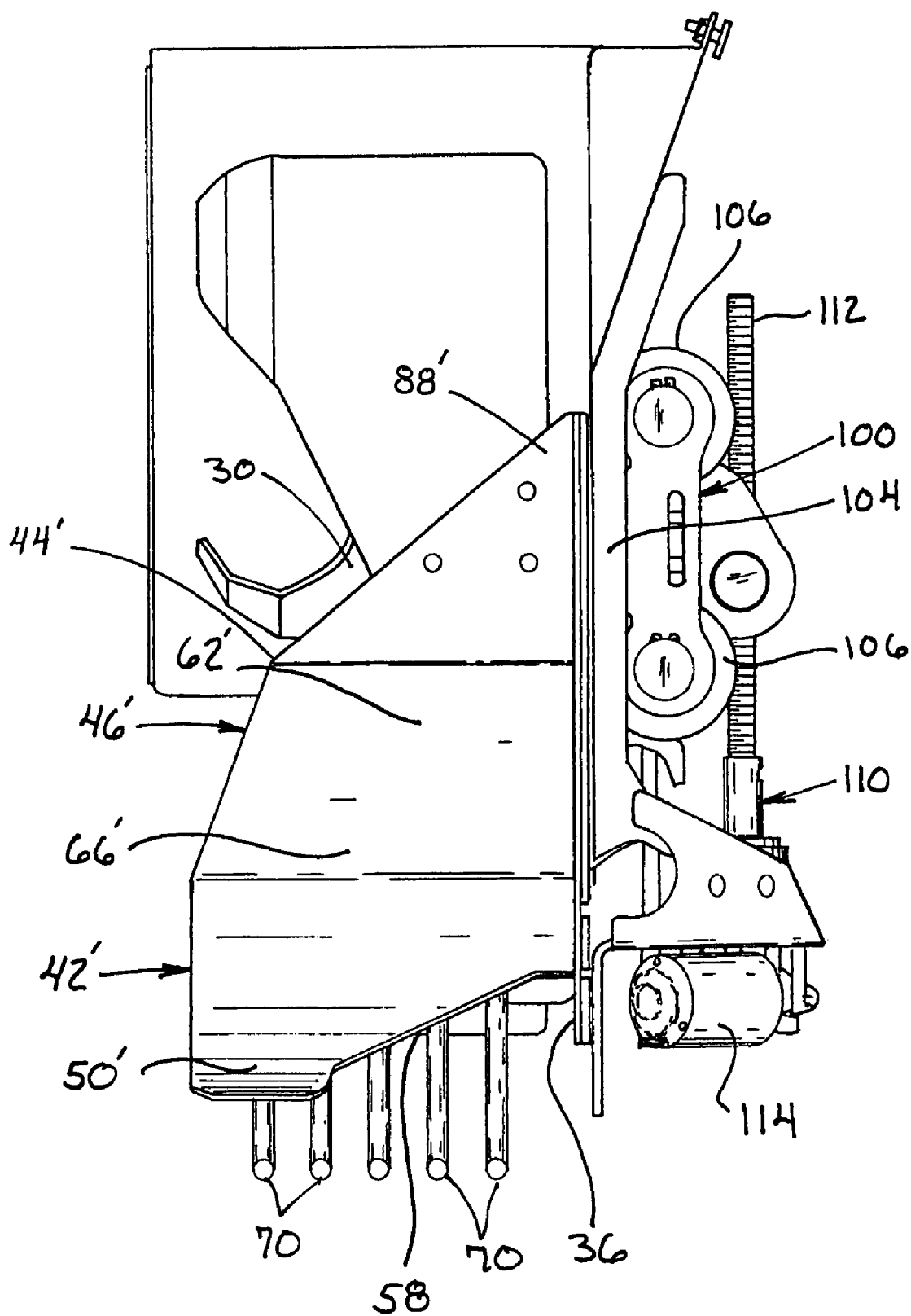
FIG. 10 is a simplified left side view of a preferred flow distributor apparatus for effecting vertical repositionings of the flow guide element of FIG. 9, depicting the relationship of the flow guide element, an adjusting mechanism embodiment for effecting vertical repositioning of the flow guide element, and the back sheet or back plate of the spreader, with the left-side impeller and spreader paddles omitted.
Figure 11:
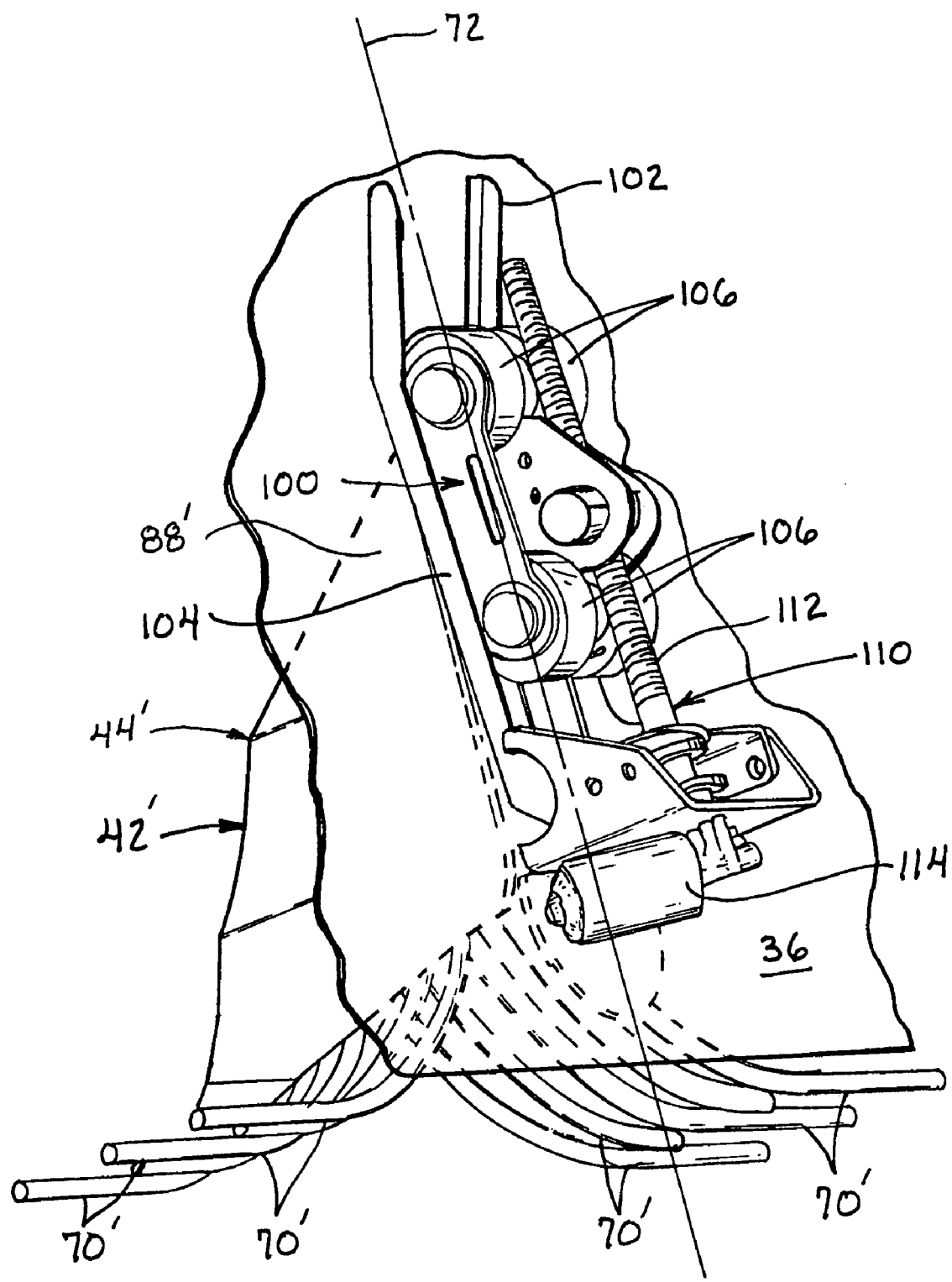
FIG. 11 is a fragmentary, perspective view, partly in cutaway, of the embodiment of FIG. 10, further detailing some of the features of such embodiment and further illustrating the dispositions of the components thereof relative to one another and to the back sheet or back plate of the spreader.

In the particular preferred embodiment set forth in FIGS. 9-15, the adjusting mechanism 78 (FIG. 4) includes a carrier or trolley cart assembly 100 at the backside of back sheet or back plate 36 of spreader 24, which cart assembly is coupled to the alternate, slightly altered flow guide element portion 42' depicted in FIGS. 9-11, as will be more fully addressed hereinafter. Such alternate flow guide element portion 42', unlike the embodiment depicted in FIGS. 3 and 4, is attached at its upper edge to flow divider plate 88', but is otherwise quite similar to the embodiment of FIGS. 3 and 4, at least in respects pertinent to the present invention. The cart assembly 100 is vertically movable generally along center line 72 within guide rails 102 and 104 on wheel members 106, and is connected to a screw drive mechanism 110 that includes a self-locking adjustment screw 112 controlled by an electric motor 114 mounted at one end of the guide rails 102, 104. Electric motor 114 is operable, such as in response to actions by an operator of the combine, to drive the adjustment screw 112 to adjust the position of the cart assembly 100 along guide rails 112, 114, and to thereby also vertically reposition coupled flow guide element 42' relative to the spreader paddles of impellers 28 and 30.

Figure 12:
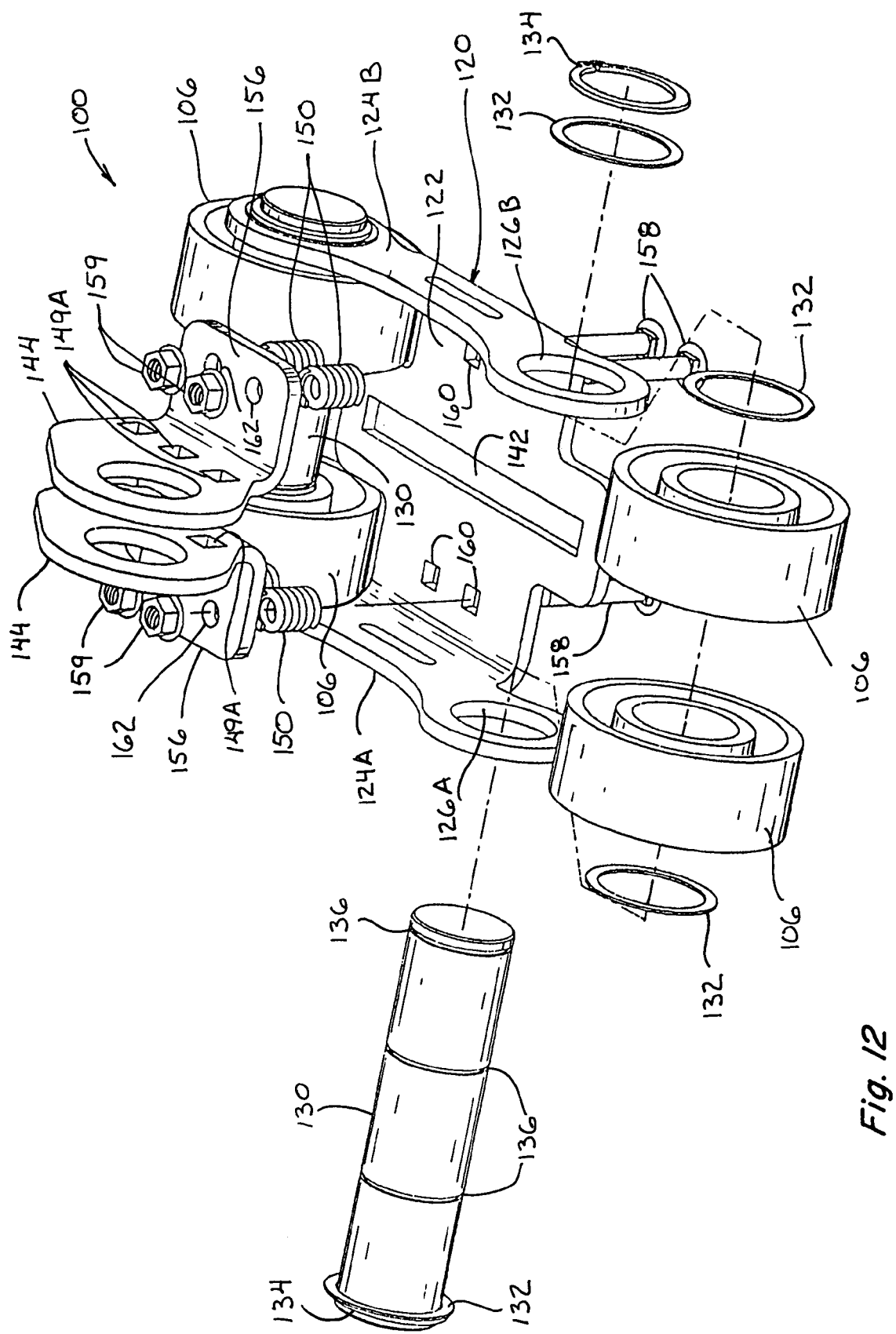
FIG. 12 is a perspective, partly exploded view of the cart assembly of FIG. 11.
Figure 13:
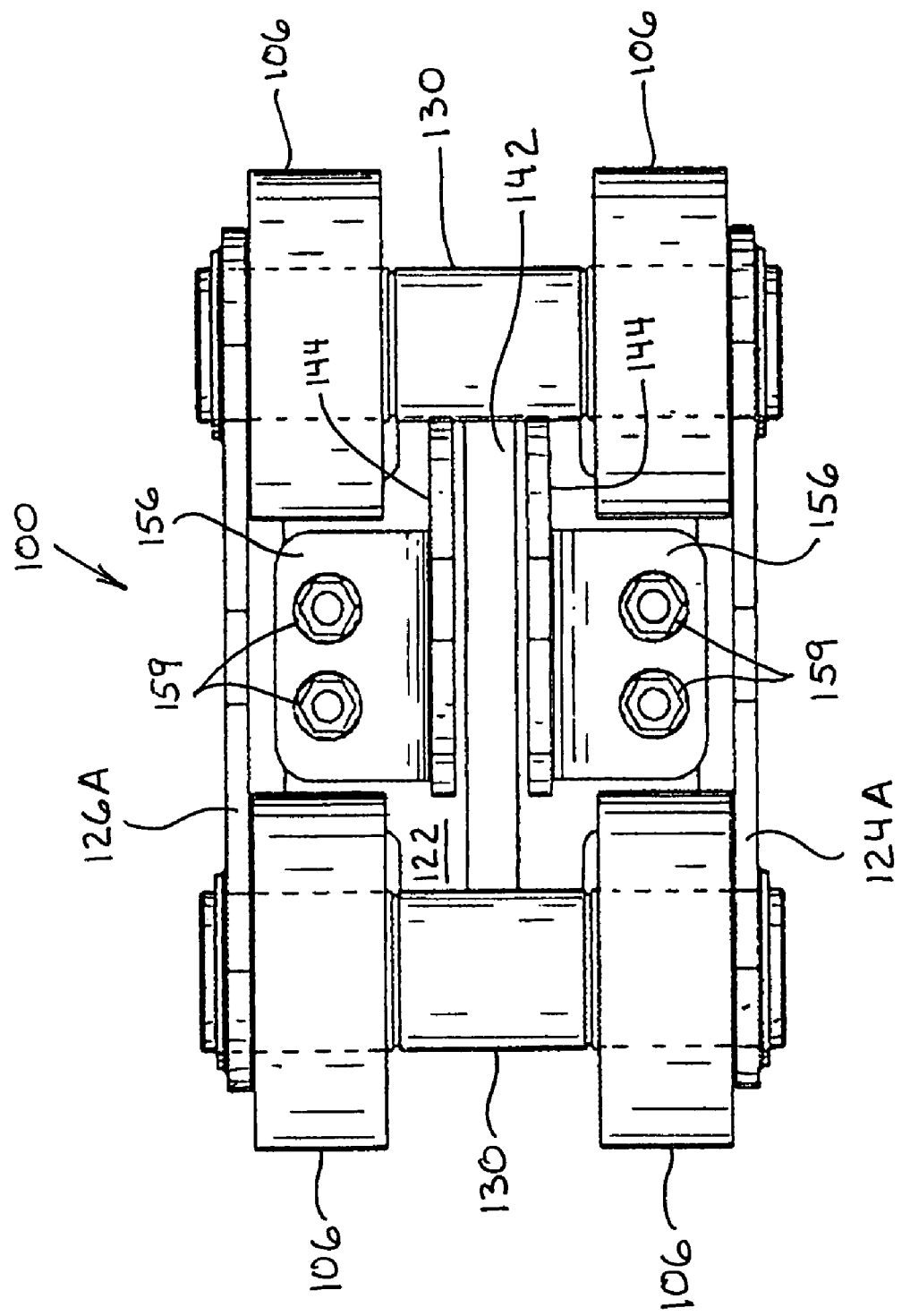
FIG. 13 is a top view of the assembled cart of FIG. 12.
Figure 14:
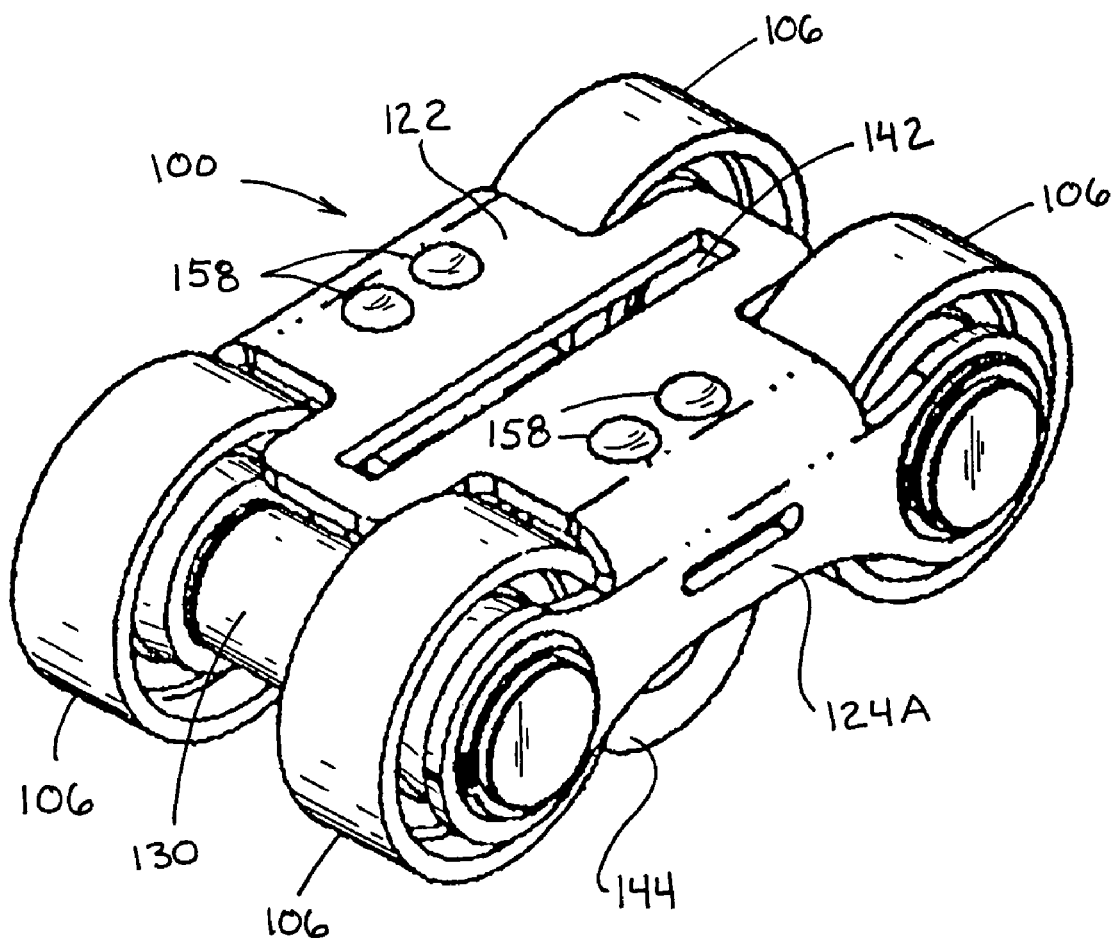
FIG. 14 is a bottom, perspective view of the assembled cart of FIG. 12.

As best shown in FIGS. 12-15, the cart assembly 100 includes a frame 120 that includes a base plate portion 122 and opposed side wall portions 124A and 124B which include paired openings therethrough near the opposite ends of such side wall portions 124A and 124B, such as paired openings 126A, 126B, which are best shown in FIG. 12. Wheels 106 are mounted upon axles 130 that extend through the paired openings, with the wheels 106 being operably secured on the axles 130 and the axles 130 being operably secured relative to the frame 120 by washers 132 and snap rings 134, with the snap rings being engageable with grooves 136 along the axles 130. The base plate portion 122 includes a centered longitudinally extending slot 142 therein, through which the coupling connector 74' (FIG. 15), which may be a tab projection, of flow guide element 42' can be inserted, and a pair of angle brackets 144 connectable to frame 120, as will be further discussed hereinafter, and positionable to clamp therebetween an end portion of coupling connector 74'. Connection members, such as carriage bolts and nuts, or like elements, can be inserted through corresponding openings 149A in the angle brackets 144 and openings 149B (FIG. 9) in the coupling connector 74' to hold such elements in fixed engagement with one another.

Figure 15:
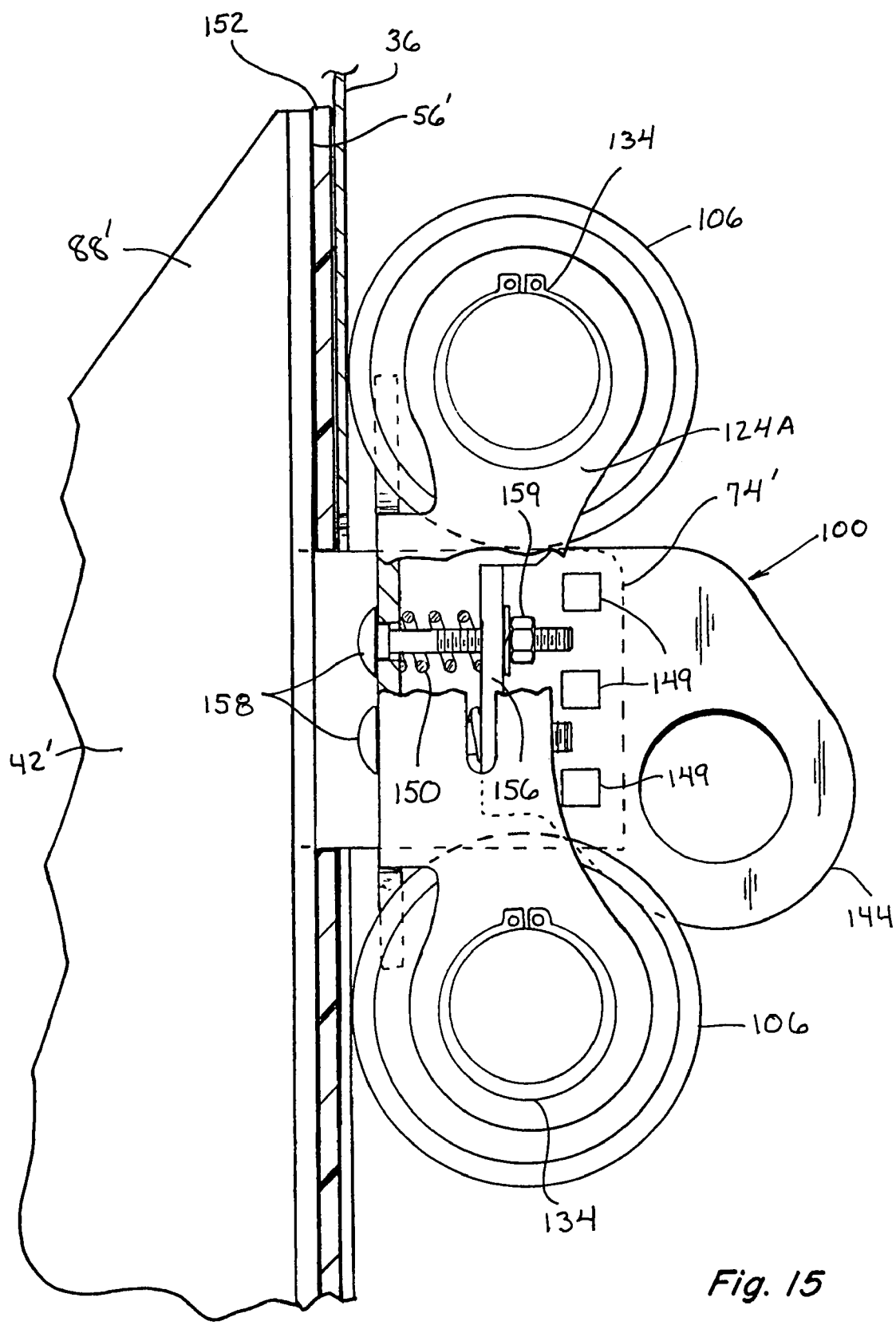
FIG. 15 is a side view, partly in cutaway, similar in some respects to FIG. 10, but depicting in better detail the coupling of the flow guide element of FIG. 9 to the assembled cart of FIG. 12, the positioning of the insert between the aft end of the flow guide element and the frontside of the back plate of the spreader, and the use of spring biasing elements to maintain the flow guide element in close association with the frontside of the back sheet or back plate of the spreader.

Preferably, springs or other types of biasing elements, such as the springs 150 which are best shown in FIGS. 12 and 15, are associated with the cart assembly 100 to provide, in conventional and well known manners, a tension through coupling connector 74' to maintain the flow guide element 42' in close association with the frontside of back sheet or back plate 36 of the spreader 24, such as in abutment with an intermediate insert, such as the insert 152 which will be further discussed hereinafter, that is disposable between flow guide element 42' and back plate 36. As best shown in FIGS. 12 and 15, the springs 150 are positionable in pairs between the base portion 122 of frame 120 and the bases 156 of the angle brackets 144 and are secured in such positions by connection members, such as carriage bolts 158 and 159, with bolts 158 being insertable through openings 160 in the base portion 122, the centers of the springs 150, and corresponding openings 162 in the bases 156 of angle brackets 144. As is illustrated in FIG. 15, the springs 150 bias the angle brackets 144 away from the backside of back sheet or back plate 36 of spreader 24. Since coupling connector 74' of flow guide element 42' is connected to the angle brackets 144, the aft end 56' of flow guide element 42' is thus biased towards the frontside of back sheet or back plate 36.

Figure 9:
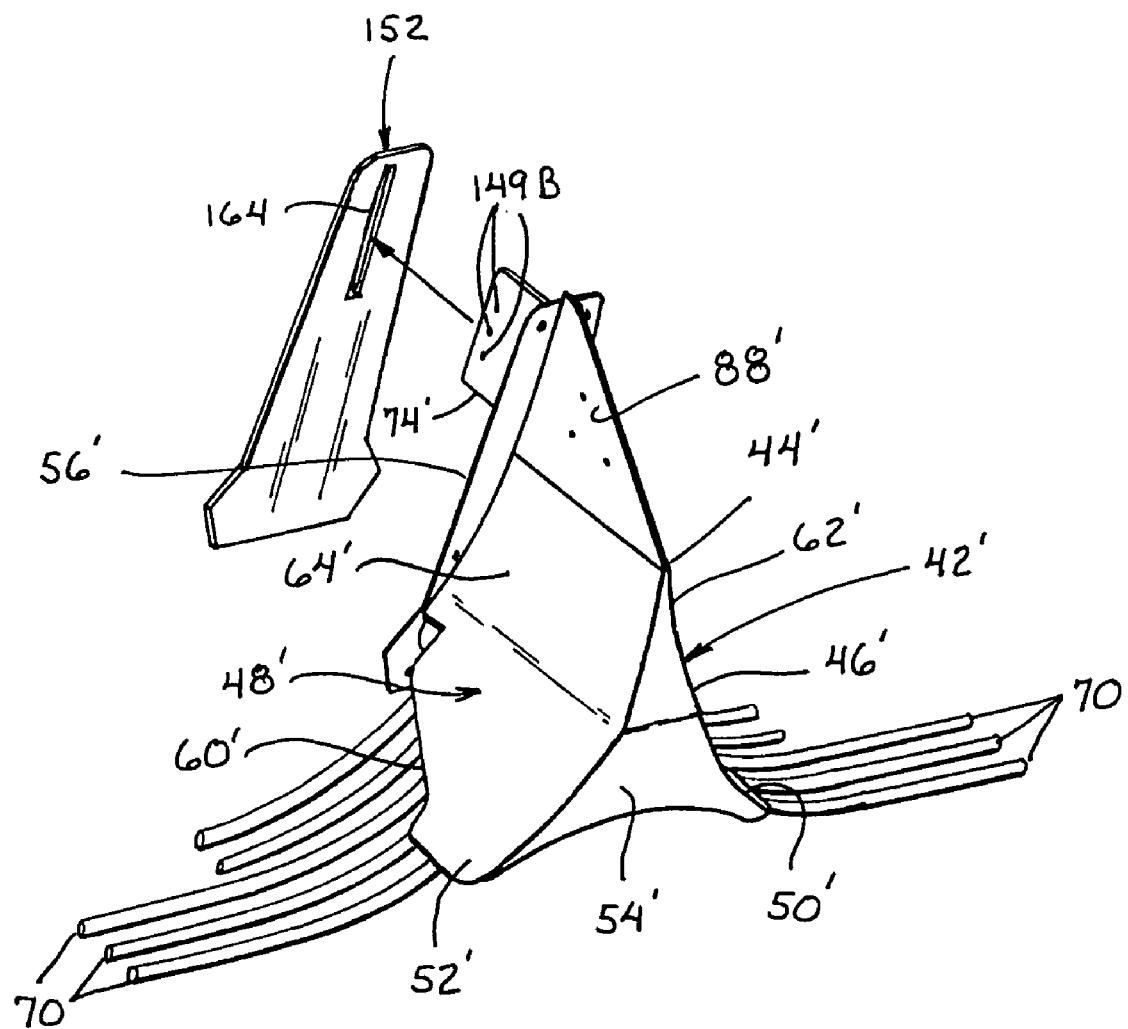
FIG. 9 is a perspective view depicting an alternate form of flow guide element that has a divider plate attached to the apex of the flow guide element portion, in conjunction with an insert having a low coefficient of friction that is positionable between the aft end of the flow guide element and the frontside of the back plate of the spreader, to facilitate sliding movement of the flow guide element relative to the back plate.

An insert 152, such as is best shown in FIG. 9, of an appropriate configuration, with an opening 164 therein, and having a low coefficient of friction, may optionally and preferably be associated with flow guide element 42' and coupling connector 74', which coupling connector may extend both through opening 164 of insert 152 and, as discussed hereinabove, through the opening in the back plate 36 to be connectable to cart assembly 100 of adjusting mechanism 78, so as to minimize the effect of frictional forces between flow guide element 42', the back sheet or back plate 36, the coupling connector 74' and the sides of opening 76 in back plate 36 as the flow guide element is being repositioned or adjusted. Such insert may be of conventional materials and configured and employed in well known manners to minimize the effects of frictional forces during movement of the various elements with respect to one another. A typical insert can be readily formed from a sheet of UHMW PE (Ultra High Molecular Weight Polyethylene) plastic trimmed to match the profile of the aft end 56' of the flow guide element 42', with a slot 164 therethrough registrable with the slot in the back sheet or back plate 36 so as to accommodate tab coupling connector 74' extending therethrough, and positioned at the aft end of the flow guide element 42' such that vertical movement of the flow guide element 42' of the embodiment depicted in FIGS. 9-15 can be effected with minimal frictional resistance. Other common materials, such as, but not limited to, Teflon or other derivatives of PE plastics, could also be equally as well utilized.

Figure 16:
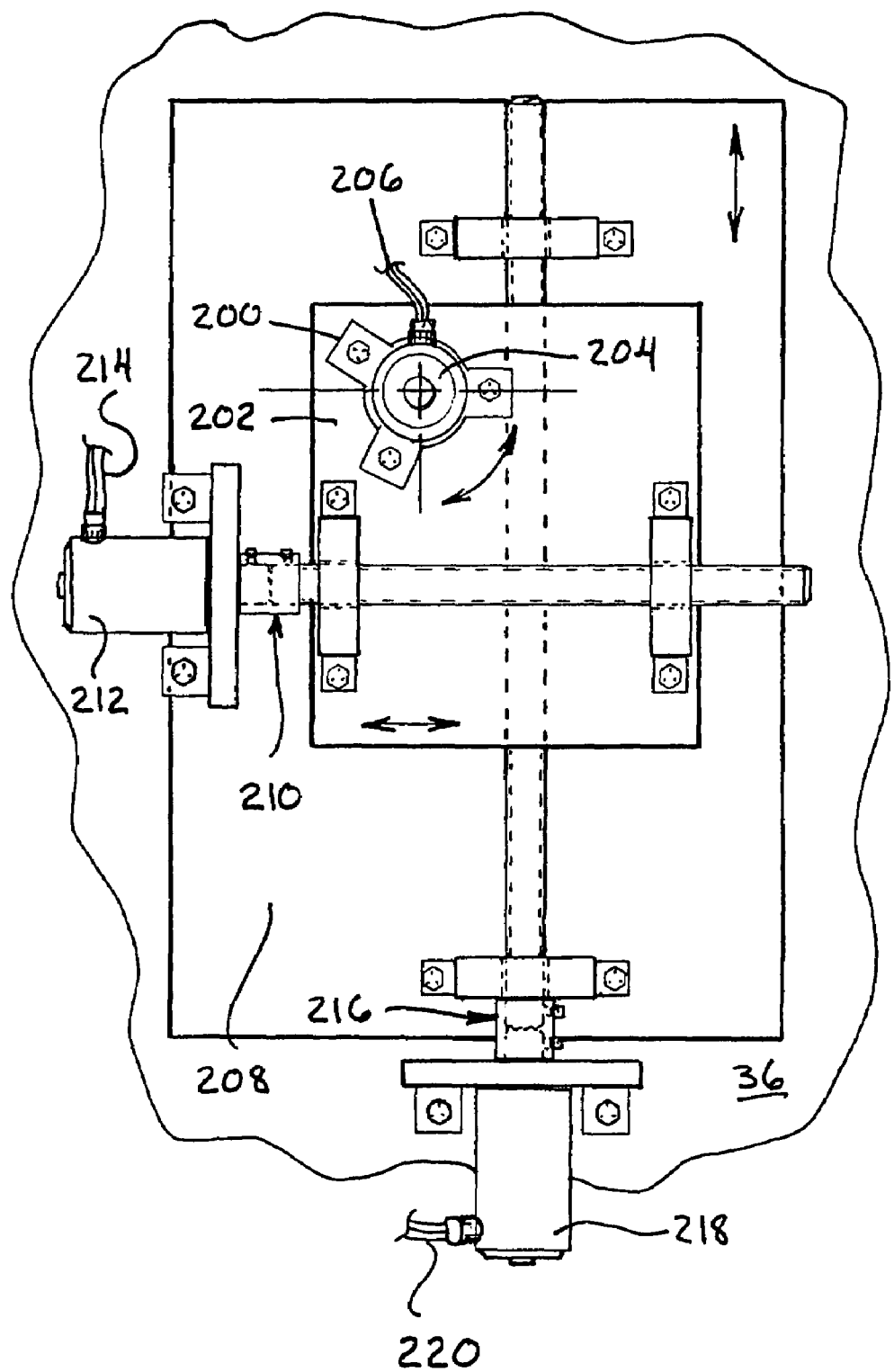
FIG. 16 is a simplified, representational view of a possible adjusting mechanism construction that would provide for and permit vertical, horizontal, and rotational repositionings of the flow guide element.

As will be appreciated by those skilled in the art, modifications may be made to the embodiments depicted in FIGS. 9-15, in well known and straightforward manners, to convert the apparatus to a construction that could be utilized to provide for adjustability in all of the vertical, horizontal, and rotational directions, instead of just the vertical direction. For example, by way of illustration, FIG. 16 depicts in a simplified, representational view one possible construction of an adjusting mechanism that would provide for and permit vertical, horizontal, and rotational repositionings of the flow guide element. In accordance with such figure, the coupling connector, which may include a stud or shaft projection at the aft end of the flow guide element that extends through the opening in the back plate of the spreader, is connected through a mounting 200 attached to an outer, horizontally movable sled or carrier assembly 202 to a motor or like actuator 204 which is operable in response to a rotational adjustment (R) input signal such as might be supplied at or through connector leads 206 to rotate the stud and, thus, the flow guide element relative to the spreader paddles. Such outer, horizontally movable sled 202 may ride upon an inner, vertically movable cart or carrier assembly 208. Movement of the outer, horizontally movable sled 202 can be controlled by a screw drive mechanism 210 that is connected to such sled 202 and that includes a drive motor or other actuator 212 mounted on the inner, vertically movable cart 208, which motor 212 is operable in response to a horizontal adjustment (X) input signal such as might be supplied at or through connector leads 214 to effect a horizontal movement of sled 202. Horizontal movement of sled 202 will result in a corresponding movement of the flow guide element. Movement of the inner vertically movable cart 208 can be controlled by a screw drive mechanism 216 that is connected to such cart 208 and that includes a drive motor 218 or other actuator mounted on the back plate 36 or frame of the spreader 24, which motor 218 is operable in response to a vertical adjustment (Y) input signal such as might be supplied at or through connector leads 220 to effect a vertical movement of cart 208. Vertical movement of cart 208 will result in a corresponding movement of the flow guide element.

As will be appreciated by those skilled in the art, various drive mechanisms other than the screw drive mechanisms depicted in FIGS. 10 and 11 and discussed hereinabove relative to FIG. 16 could be equally as well employed to move cart assembly 100 or the carrier assemblies 202 and 208. By way of example, and not of limitation, FIG. 17, which is a somewhat generalized rear view of the back plate 36 of spreader 24 also showing the drive apparatus 228, 230 for the impellers 28 and 30 of spreader 24, depicts an alternate adjusting mechanism for a flow guide element similar to the flow guide element 42' depicted in FIGS. 9-15, which adjusting mechanism includes a cart assembly 100 driven by a linear actuator 240 instead of a screw drive to effect vertical movement of the cart assembly along the backside of back plate 36 or spreader 24 and vertical repositioning of the flow guide element 42' which is coupled to cart assembly through coupling connector 76'.

Figure 17:
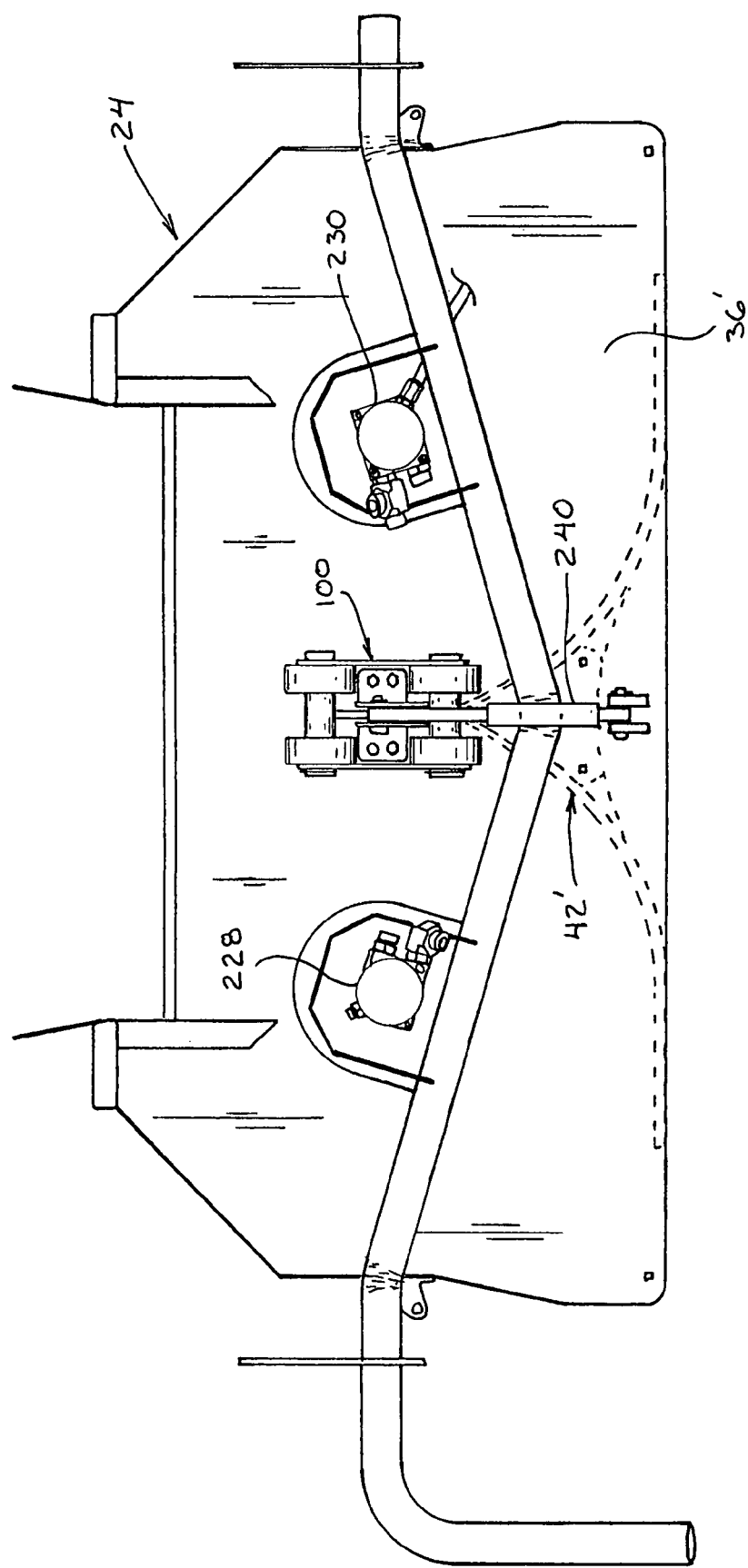
FIG. 17 is a somewhat generalized rear view of the backside of the back plate of a spreader illustrating a manner in which the assembled cart of FIG. 12 can be disposed relative to the back plate and operably controllably positioned by a linear actuator to effect a vertical repositioning of a flow guide element coupled to the cart.
Figure 18:
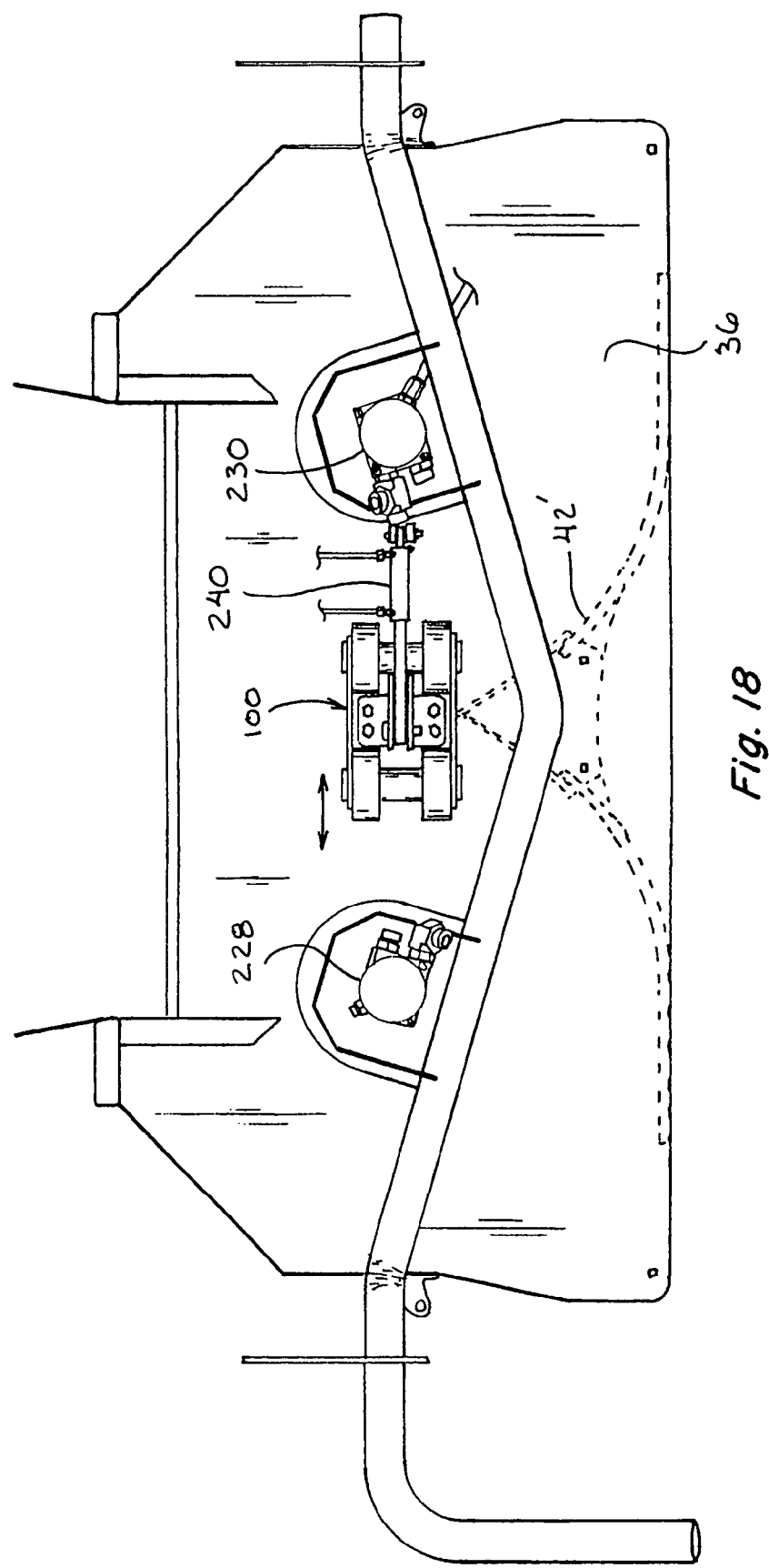
FIG. 18 is a somewhat generalized rear view of the backside of the back plate of a spreader illustrating a manner in which the assembled cart of FIG. 12 can be disposed relative to the back plate and operably controllably positioned by a linear actuator to effect a horizontal repositioning of a flow guide element coupled to the cart.

By a re-orientation of the cart assembly 100 of FIG. 17 from a vertical position relative to the back plate 36 of spreader 24 to a horizontal position, and by complementary modifications of the coupling connector and of the openings through the backplate 36 and the insert 152 to provide for attachment of the coupling connector to the re-oriented cart assembly 100, an embodiment such as that depicted in FIG. 18, suitable for use in effecting horizontal, as opposed to vertical, repositioning of the flow guide element relative to the impellers 28 and 30 can be readily derived.

From the foregoing, it should be readily understood and appreciated that the cart assembly of FIGS. 17 and 18 could also be modified to engage a coupling connector in the form of a shaft, instead of a tab projection, and to carry or be linked to a rotator drive, such as a motor or linear actuator, that is operable to effect a rotation of the shaft and the coupled flow guide element relative to the impellers 28 and 30.

Figure 19:
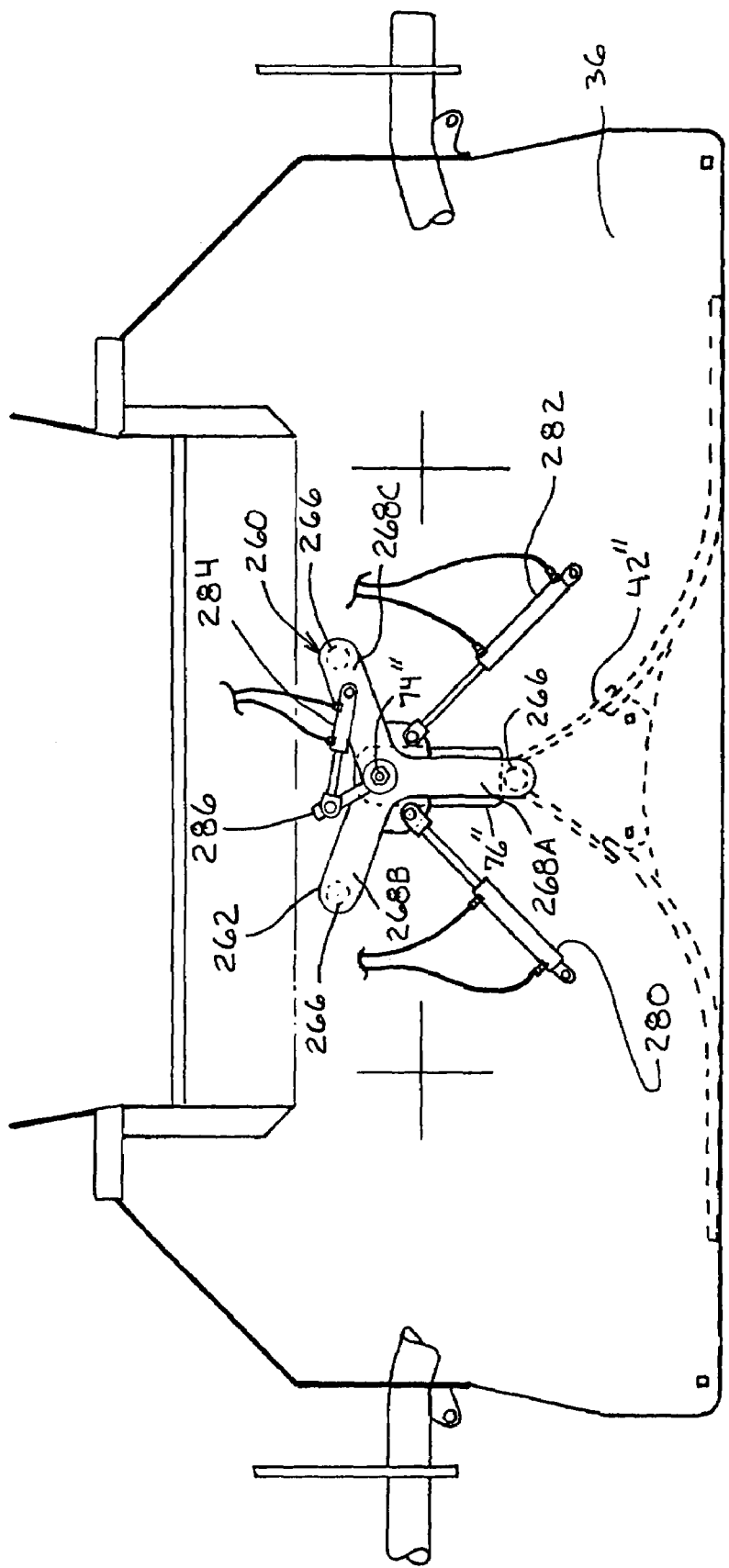
FIG. 19 is a somewhat generalized rear view of the backside of the back plate of a spreader depicting an alternate adjusting mechanism, including a tripod carrier assembly, disposed relative to the back plate and operably controllably positioned by a plurality of linear actuators to reposition such tripod and to effect horizontal, vertical, and/or rotational repositionings, or combinations thereof, of a flow guide element coupled to the tripod carrier assembly.
Figure 20:
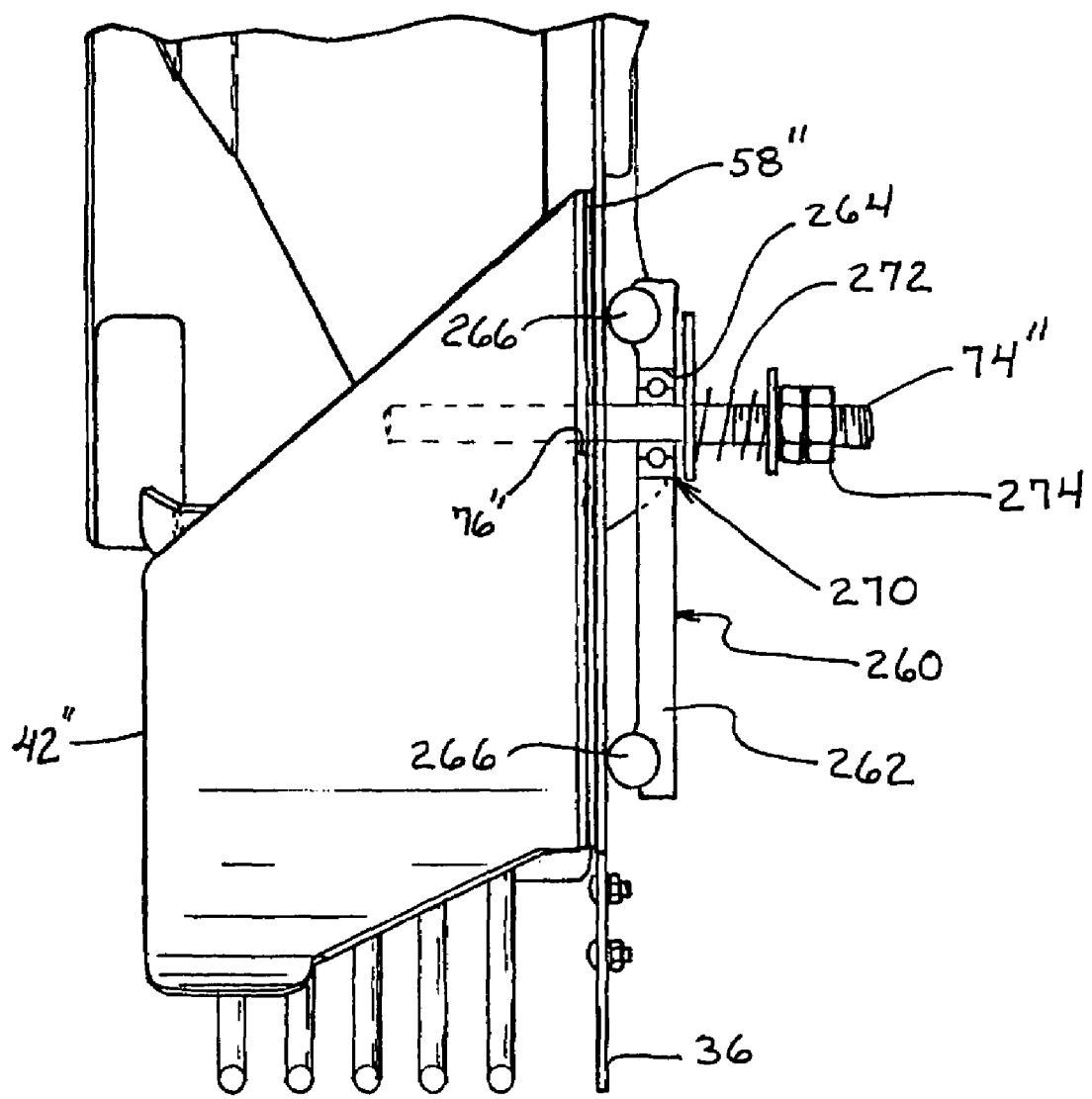
FIG. 20 is a side view of the adjusting mechanism of FIG. 19 illustrating the coupling of the flow guide element of FIG. 19 to such adjusting mechanism, the positioning of the insert between the aft end of the flow guide element and the frontside of the back plate of the spreader, and the use of a spring biasing element to maintain the flow guide element in close association with the frontside of the back sheet or back plate of the spreader.

Similarly, it should be recognized that various adjusting mechanisms other than that depicted in FIG. 16 can also be employed to effect vertical, horizontal, or rotational repositionings, or combinations thereof, of the flow guide element. FIGS. 19 and 20 depict one such possible alternate embodiment of the invention that includes a flow guide element 42", which is similar to flow guide element 42' except for a coupling connector that has the form of an end threaded shaft 74" instead of the tab projection 74', and an adjusting mechanism that includes a carrier assembly 260 including a tripod frame 262 having a center opening 264 sized to fit over and around shaft 74". Tripod frame 262, which may preferably be constructed of sheet metal, or may even more preferably be a steel casting, is supported by cart wheels 266 associated with each of the arms 268A, 268B, and 268C of the frame, which wheels may preferably be pivoting caster wheels or captured steel ball bearings that roll on the backside of back plate 36 of spreader 24. Such tripod frame 262 may also include an associated thrust bearing 270 at or adjacent to the center opening 264 through which the coupling connector shaft 74" may extend when the flow guide element 42" is positioned generally adjacent the frontside of back plate 36, with shaft 74" projecting through opening 76" in back plate 36, and when the tripod frame 262 is positioned generally adjacent to the backside of back plate 36. A compression spring 272 may then be installed over the shaft 74" and a nut or other cap member or apparatus 274 installed on the end of shaft 74" to compress compression spring 272 sufficiently to apply a force through the attached nut 274 on the end of shaft 74" and through shaft 74" to bias the aft end 56" of flow guide element 42" towards the frontside of back plate 36.

With tripod frame 262 positioned adjacent to the backside of back plate 36 with arm 268A extending generally vertically and with arms 268B and 268C disposed at generally equal angles to the vertical, actuators 280 and 282 are mounted on or adjacent to back plate 36 and rigidly connected to tripod frame 262, such as by pin connections, near the junctures of arms 268A and 268B and arms 268A and 268C, as best shown in FIG. 19. Operation of such actuators serves to move the tripod frame 262 to reposition such frame 262 and the coupled flow guide element 42" to a desired X-Y positioning, and may be effected under computer control in response to operator input from the cab of the combine. Determination of the appropriate operation required by the actuators 280 and 282 to effect movement of the flow guide element 42" to a desired X-Y position will depend to some extent upon the particular designs, characteristics, and positionings of the tripod frame 262, the actuators 280 and 282, and the connections therebetween. A rotational actuator 284, which is attached to arm 268C of tripod frame 262, is connected to a pivot arm 286 that is also attached to shaft 74", and when operated, effects rotational movement of coupled flow guide element 42".

From the foregoing, it should thus be understood and recognized that various combinations of controlled motion can be effected not only by the particular embodiments described and discussed herein, but also by other embodiments that may, for example, employ simplified or enhanced versions or forms of the tripod or a like carrier assembly, such as for X-Y-R movement, or various versions or forms of a trolley cart with a flow guide element that has a shaft-like coupling connector, such as for X-R or Y-R motion. The identifications of and discussions describing such specific configurations and their operations is not intended, however, to rule out any other embodiments that might be employed to the same effect within the spirit and scope of the invention.

As will be apparent from all the foregoing, many of the elements discussed herein, including the flow guide element, the coupling connector, and the adjusting mechanism, may take varied and alternate forms, and certain elements, such as the divider plate and the insert described hereinabove, may optionally be included or excluded, depending upon the desires of users and the requirements and configurations of combines and spreaders with which the present invention may be employed.

It will also be recognized that, although the present invention need not have or rely upon fore and aft adjustments of the flow guide element or movably adjustable arm elements, such as is as disclosed and discussed in co-pending U.S. patent application Ser. No. 11/194,844, the use of such is also not prohibited by the present invention, especially to the extent that the use of such features in the practice of the present invention may permit further refinements in the controlled deposit of crop residue upon a field.

Figure 21:
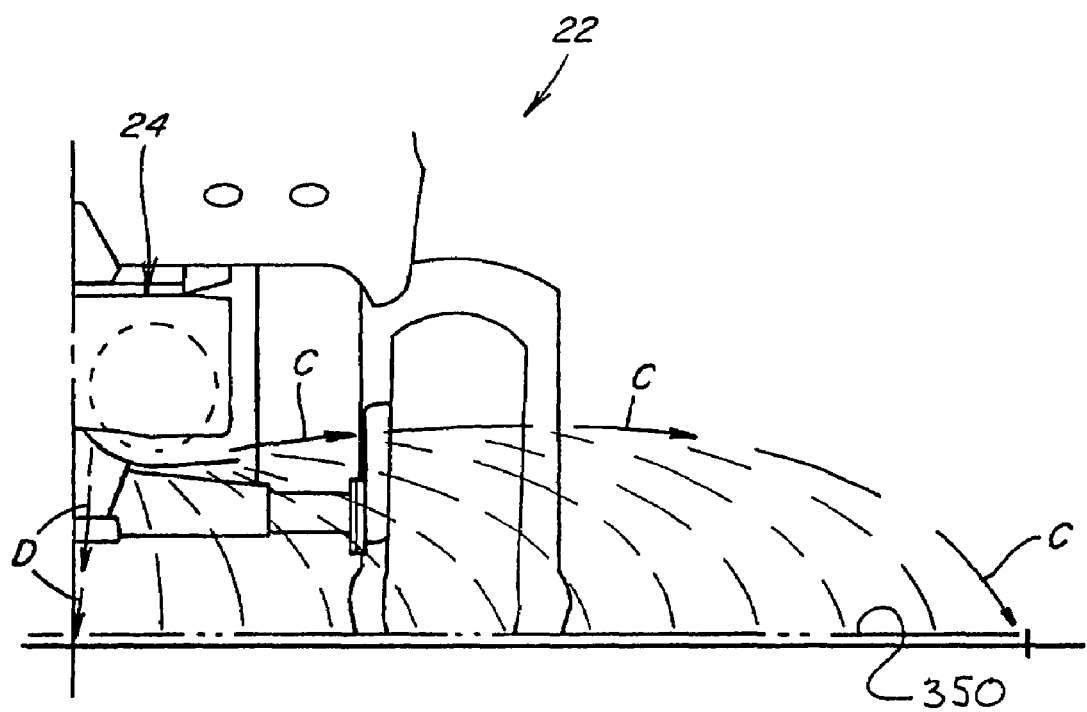
FIG. 21 is a simplified schematic rear view of a right rear end of the combine and spreader, showing a representative pattern of crop residue distribution by the flow distributor apparatus on that side of the spreader.
Figure 22:
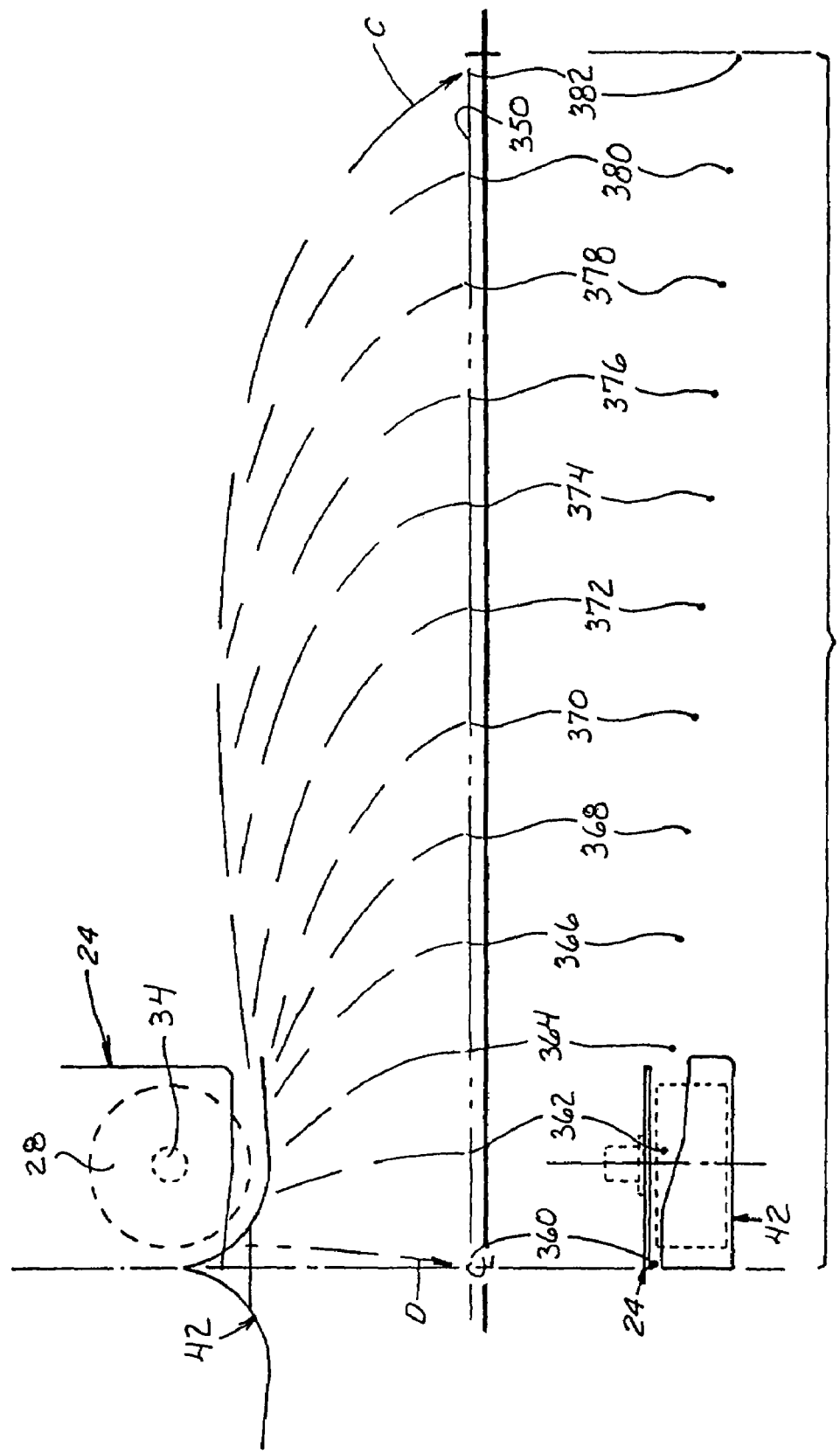
FIG. 22 is a simplified schematic rear view of a right rear end of the spreader and flow distributor apparatus, in combination with a bottom view thereof, diagrammatically illustrating characteristics of a pattern of crop residue flow distribution therefrom.

FIGS. 21 and 22 illustrate crop residue distribution patterns 350 that are possible using a flow distributor apparatus of the present invention in cooperation with a vertical spreader such as spreader 24 on combine 22. As has been discussed hereinabove, particularly in reference to FIG. 2, a substantially even or uniform crop residue distribution pattern, denoted by line 350, can be achieved as between flows C and D, by making required adjustments of the position of a flow guide element, such as flow guide element 42, in the above discussed manners. The dots 360-382 in FIG. 22 illustrate approximate locations along pattern 350 where crop residue flowing along the correspondingly numbered lines may be distributed on a field.

As will be appreciated from the foregoing description and discussion, and as may be best observed by reference to FIGS. 3-8, as the clearance between the flow guide element 42 and the outer swept diameter of the spreader paddles of impeller 28 is increased, such as by a vertical or rotational repositioning of flow guide element, the throw of crop residue will be altered such that, by way of example, the throw that had before landed at dot 382 (FIG. 22), might now land at dot 374. Consequently, as geographical and environmental conditions change, repositioning of the flow guide element relative to the spreader paddles can be controllably effected to obtain a desired distribution pattern for the conditions then existing.

In light of all the foregoing, it should thus be apparent to those skilled in the art that there has been shown and described a flow distributor apparatus, and method of use thereof, that can be utilized to provide a desired pattern of crop residue distribution therefrom to obtain a more uniform distribution of crop residue over a swath of an agricultural field from which the crop was harvested, especially under varying geographic and environmental conditions. However, it should also be apparent that, within the principles and scope of the invention, many changes are possible and contemplated, including in the details, materials, steps, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A flow guide distributor apparatus for a combine spreader having an inlet opening at the top thereof for receiving crop residue, a pair of counter-rotating spreader paddles disposed generally side by side below the inlet opening and forward of a back plate of the spreader, and a discharge opening below the spreader paddles, comprising a flow guide element having
    front and aft ends,
    an apex portion, and
    a pair of opposed laterally extending arm portions depending from said apex portion to free end portions,
    said arm portions including surfaces extending longitudinally between said fore and aft ends of said flow guide element, said longitudinally extending surfaces defining crop residue flow surfaces,
    said flow guide element disposed generally adjacent to the back plate of the spreader and generally intermediate to the spreader paddles, with said aft end generally proximate to the frontside of the back plate of the spreader, with said crop residue flow surfaces beneath the inlet opening of the spreader, and with at least said free end portions disposed such that said crop residue flow surfaces are located generally extending beneath portions of the spreader paddles and sidewardly outwardly relative thereto to the free end portions of the flow guide,
an adjusting mechanism, and
a coupling connector for coupling said adjusting mechanism to said flow guide element, said adjusting mechanism operable to effect directional movement of said flow guide element in at least one of vertical, horizontal, or rotational directions relative to the spreader paddles to adjustably vary the clearance between the outer swept diameters of the pair of spreader paddles and said crop residue flow surfaces of said flow guide element, whereby, as a flow of crop residue is introduced into the inlet opening of the spreader at least a portion of such flow is directed towards said crop residue surfaces of said flow guide element by operation of the counter-rotating spreader paddles and is adjustably directed by said flow guide element, dependent upon its positioning relative to the spreader paddles, sidewardly outwardly upon the discharge thereof through the discharge opening of the spreader to controllably distribute the crop residue in a desired pattern over a field.

2. The flow distributor apparatus of claim 1 wherein the back plate of the spreader includes an opening therethrough and said coupling connector extends through said opening and operatively connects said flow guide element to said adjusting mechanism, operation of said adjusting mechanism effecting a coupled movement reaction by said flow guide element.

3. The flow guide apparatus of claim 2 wherein said coupling connector includes a protrusion projecting from said aft end of said flow guide element and extending through the opening in the back plate, said adjusting mechanism being disposed adjacent the backside of the back plate of the spreader and engaging said projecting protrusion.

4. The flow guide apparatus of claim 3 wherein said adjusting mechanism includes a biasing assembly therewith for applying a tension through said coupling connector to said flow guide element to maintain said aft end of said flow guide element in close proximity to the frontside of the back plate of the spreader.

5. The flow guide apparatus of claim 3 including an insert associatable with said aft end of said flow guide element and the frontside of the back plate of spreader for facilitating slidable movement therebetween, said insert being formed of a material having a low coefficient of friction and configured to be conformably disposed between said aft end of said flow guide element and the frontside of the back plate.

6. The flow guide apparatus of claim 5 wherein said insert has a sheet-like configuration and is engageable with said flow guide element to be slidably movable therewith relative to the frontside of the back plate.

7. The flow distributor apparatus of claim 2 wherein the opening in the back plate of the spreader is a generally vertical slot through which said projecting stud extends and along which said projecting protrusion is movable.

8. The flow distributor apparatus of claim 7 wherein said adjusting mechanism includes
 a cart assembly coupled to said projecting protrusion and movable along the backside of the back plate of the spreader, and
 a drive assembly for effecting controlled movement of said cart assembly in response to input drive signals.

9. The flow distributor apparatus of claim 8 wherein said drive assembly includes a screw drive mechanism including a self locking screw connected to said cart assembly and having a drive end coupled to a drive motor actuatable in response to said input drive signals to drive said screw and to effect a repositioning of the cart assembly, said repositioning of said cart assembly also effecting movement of said projecting protrusion along the generally vertical slot in the back plate of the spreader and generally vertical movement of said flow guide element adjacent the frontside of the back plate of the spreader, said generally vertical movement of said flow guide element effecting a repositioning of said flow guide element relative to the spreader paddles and altering the clearances between the outer swept diameters of the spreader paddles and crop residue flow surfaces of said arm portions of said flow guide element.

10. The flow distributor apparatus of claim 8 wherein said drive assembly includes a linear actuator operably connected to said cart assembly to effect a repositioning of the cart assembly, said repositioning of said cart assembly also effecting movement of said projecting protrusion along the generally vertical slot in the back plate of the spreader and generally vertical movement of said flow guide element adjacent the frontside of the back plate of the spreader, said generally vertical movement of said flow guide element effecting a repositioning of said flow guide element relative to the spreader paddles and altering the clearances between the outer swept diameters of the spreader paddles and crop residue flow surfaces of said arm portions of said flow guide element.

11. The flow distributor apparatus of claim 1 wherein the back plate of the spreader includes an opening therethrough and said coupling connector includes a connection member operably connecting said flow guide element to said adjusting mechanism through the opening in the back plate of the spreader, which opening is sized and configured to accommodate the allowable movement of said connection member, movement of said connection member effecting a corresponding movement of said flow guide element, said adjusting mechanism operable to effect movement of said coupling connector in response to input drive signals.

12. The flow distributor apparatus of claim 11 wherein said adjusting mechanism is responsive to certain input drive signals to effect generally vertical movement of said flow guide element relative to the spreader paddles.

13. The flow distributor apparatus of claim 11 wherein said adjusting mechanism is responsive to certain input drive signals to effect generally horizontal movement of said flow guide element relative to the spreader paddles.

14. The flow distributor apparatus of claim 11 wherein said adjusting mechanism is responsive to certain input drive signals to effect generally rotational movement of said flow guide element relative to the spreader paddles.

15. The flow distributor apparatus of claim 14 wherein the axis of rotation of said flow guide element is generally parallel to the axes of rotation of the spreader paddles.

16. The flow distributor apparatus of claim 14 wherein said adjusting mechanism is also responsive to certain input drive signals to effect translational movements, generally transverse to the axes of the spreader paddles, of said flow guide element relative to the spreader paddles.

17. The flow distributor apparatus of claim 16 wherein said adjusting mechanism includes a first input connection for receiving drive signals to effect generally vertical movement of said flow guide element relative to the spreader paddles, a second input connection for receiving drive signals to effect generally horizontal movement of said flow guide element relative to the spreader paddles, and a third input connection for receiving drive signals to effect generally rotational movement of said flow guide element relative to the spreader paddles.

18. The flow distributor apparatus of claim 17 wherein said drive signals are provided to said input connections of said adjusting mechanism in response to actions by an operator of the spreader.

19. The flow distributor apparatus of claim 11 wherein said adjusting mechanism is responsive to input drive signals to effect translational movements, generally transverse to the axes of the spreader paddles, of said flow guide element relative to the spreader paddles.

20. The flow distributor apparatus of claim 11 wherein, for each type of directional movement of said flow guide element that can be effected by operation of said adjusting mechanism, said adjusting mechanism includes a separate drive actuator controllably operable to effect movement in such direction.

21. The flow distributor apparatus of claim 20 wherein said drive actuators are remotely controllable.

22. The flow distributor apparatus of claim 1 wherein said arm portions of said flow guide element are essentially mirror images of one another.

23. The flow distributor apparatus of claim 1 wherein said crop residue flow surfaces are tapered at said free end portions.

24. The flow distributor apparatus of claim 1 wherein said flow guide element includes a plurality of finger projections attached at said free end portions and longitudinally spaced therealong, said finger projections extending sidewardly from said free end portions beneath the spreader paddles.

25. The flow distributor apparatus of claim 1 wherein at least portions of said crop residue flow surfaces include generally concavely curved surfaces.

26. The flow distributor apparatus of claim 25 wherein, for a given positioning of said flow guide element approximately centered along a vertical center line between the spreader paddles, said concavely curved surfaces of each arm portion are associated with respective spreader paddles and are approximately concentric with the outer swept diameters of the respective spreader paddles.

27. A method for controllably adjusting the flow of crop residue through a spreader and the sidewardly outwardly discharge thereof from such spreader for distribution over a field in a desired pattern, including providing a spreader to receive as input a flow of crop residue from a combine, said spreader having an inlet opening at the top thereof for receiving crop residue, a back plate, a pair of counter-rotating spreader paddles disposed generally side by side below the inlet opening and forward of the back plate, and a discharge opening below the spreader paddles, providing a flow distributor apparatus for use with such spreader, the flow distributor apparatus including a flow guide element, an adjusting mechanism, and a coupling connector coupling the adjusting mechanism to the flow guide element, the flow guide element having front and aft ends, an apex portion, and a pair of opposed laterally extending arm portions depending from the apex portion to free end portions, the arm portions including surfaces extending longitudinally between the fore and aft ends of the flow guide element, the longitudinally extending surfaces defining crop residue flow surfaces, the flow guide element disposed generally adjacent to the back plate of the spreader and generally intermediate to the spreader paddles, with the aft end generally proximate to the frontside of the back plate of the spreader, with the crop residue flow surfaces beneath the inlet opening of the spreader, and with at least the free end portions disposed such that the crop residue flow surfaces are located generally extending beneath portions of the spreader paddles and sidewardly outwardly relative thereto to the free end portions of the flow guide, the adjusting mechanism operable to effect directional movement of the flow guide element in at least one of vertical, horizontal, or rotational directions relative to the spreader paddles to adjustably vary the clearance between the outer swept diameters of the pair of spreader paddles and the crop residue flow surfaces of said flow guide element, operating the adjusting mechanism to effect a movement of the flow guide element relative to the spreader paddles to alter the clearance between the outer swept diameters of the pair of spreader paddles and said crop residue flow surfaces of said flow guide element, whereby the flow of crop residue is adjustably directed by the flow guide element, dependent upon its positioning relative to the spreader paddles, sidewardly outwardly upon the discharge thereof through the discharge opening of the spreader to controllably distribute the crop residue in a desired pattern over the field.

28. The method of claim 27 wherein, for each type of directional movement of the flow guide element that can be effected by operation of said adjusting mechanism, the adjusting mechanism includes a separate drive actuator controllably operable to effect movement in such direction.

29. The method of claim 27 wherein operation of the adjusting mechanism is remotely controllable.

\* \* \* \* \*